US012658087B2

(12) United States Patent
Kim et al.

(10) Patent No.: US 12,658,087 B2
(45) Date of Patent: Jun. 16, 2026

(54) DISPLAY PANEL AND DISPLAY APPARATUS INCLUDING THE SAME

(71) Applicant: Samsung Display Co., Ltd., Yongin-Si (KR)

(72) Inventors: Dongwoo Kim, Yongin-si (KR); Kwihyun Kim, Yongin-si (KR); Yeonkyung Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/439,773

(22) Filed: Feb. 13, 2024

(65) Prior Publication Data

US 2024/0346972 A1 Oct. 17, 2024

(30) Foreign Application Priority Data

Apr. 17, 2023 (KR) ........................ 10-2023-0050168

(51) Int. Cl.
*G09G 3/3233* (2016.01)
*G09G 3/20* (2006.01)

(52) U.S. Cl.
CPC ....... *G09G 3/20* (2013.01); *G09G 2300/0452* (2013.01); *G09G 2300/0819* (2013.01); *G09G 2300/0852* (2013.01); *G09G 2300/0861* (2013.01); *G09G 2310/08* (2013.01)

(58) Field of Classification Search
CPC ... G09G 2300/0819; G09G 2300/0852; G09G 2300/0861; G09G 3/30; G09G 3/3233; G09G 3/3258; G09G 3/3225; G09G 3/3208
See application file for complete search history.

(56) References Cited

U.S. PATENT DOCUMENTS

| | | | | |
|---|---|---|---|---|
| 6,580,657 | B2 | 6/2003 | Sanford et al. | |
| 8,063,857 | B2 | 11/2011 | Kohno et al. | |
| 9,691,325 | B2 | 6/2017 | Park et al. | |
| 11,423,833 | B2 | 8/2022 | Kim | |
| 2021/0390905 | A1* | 12/2021 | Kim | H10K 59/1216 |
| 2024/0087516 | A1* | 3/2024 | Yuan | H10K 59/131 |

FOREIGN PATENT DOCUMENTS

| | | | |
|---|---|---|---|
| JP | 5342111 | B2 | 11/2013 |
| KR | 10-2020-0036415 | A | 4/2020 |
| KR | 10-2274740 | B1 | 7/2021 |
| KR | 10-2021-0155038 | A | 12/2021 |

* cited by examiner

*Primary Examiner* — Dennis P Joseph
(74) *Attorney, Agent, or Firm* — Innovation Counsel LLP

(57) ABSTRACT

A display panel is disclosed that includes a first pixel, a second pixel and an initialization transistor. The first pixel includes a first light emitting element configured to emit light based on a data writing gate signal, an initialization gate signal, a compensation gate signal, an emission signal and a first data voltage. The second pixel includes a second light emitting element configured to emit light based on the data writing gate signal, the initialization gate signal, the compensation gate signal, the emission signal and a second data voltage. The initialization transistor is commonly connected to the first pixel and the second pixel. The initialization transistor is configured to output an initialization voltage to the first pixel and the second pixel in response to the initialization gate signal.

11 Claims, 20 Drawing Sheets

DISPLAY PANEL AND DISPLAY APPARATUS INCLUDING THE SAME

PRIORITY STATEMENT

This application claims priority under 35 U.S.C. § 119 to Korean Patent Application No. 10-2023-0050168, filed on Apr. 17, 2023 in the Korean Intellectual Property Office KIPO, the contents of which are herein incorporated by reference in their entireties.

BACKGROUND

1. Field

Embodiments of the present inventive concept relate to a display panel and a display apparatus including the display panel. More particularly, embodiments of the present inventive concept relate to a display panel including fewer transistors and a display apparatus including the display panel.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

SUMMARY

Embodiments of the present inventive concept may provide a display panel including fewer transistors, which may provide an ultra-high resolution display apparatus.

Embodiments of the present inventive concept may also provide a display apparatus including the display panel.

In an embodiment of a display panel according to the present inventive concept, the display panel includes a first pixel, a second pixel and an initialization transistor. The first pixel includes a first light emitting element configured to emit light based on a data writing gate signal, an initialization gate signal, a compensation gate signal, an emission signal and a first data voltage. The second pixel includes a second light emitting element configured to emit light based on the data writing gate signal, the initialization gate signal, the compensation gate signal, the emission signal and a second data voltage. The initialization transistor is commonly connected to the first pixel and the second pixel. The initialization transistor is configured to output an initialization voltage to the first pixel and the second pixel in response to the initialization gate signal.

In an embodiment, the display panel may further include a third pixel including a third light emitting element configured to emit light based on the data writing gate signal, the initialization gate signal, the compensation gate signal, the emission signal and a third data voltage. The initialization transistor may be commonly connected to the first pixel, the second pixel and the third pixel. The initialization transistor may be configured to output the initialization voltage to the first pixel, the second pixel and the third pixel in response to the initialization gate signal.

In an embodiment, the first pixel may be a red pixel. The second pixel may be a green pixel. The third pixel may be a blue pixel.

In an embodiment, the first pixel may further include a first transistor including a control electrode connected to a gate node, a first electrode configured to receive a first power voltage and a second electrode connected to a second node, a second transistor including a control electrode configured to receive the data writing gate signal, a first electrode configured to receive the first data voltage and a second electrode connected to a first node, a third transistor including a control electrode configured to receive the compensation gate signal, a first electrode connected to the gate node and a second electrode connected to the second node, a fourth transistor including a control electrode configured to receive the emission signal, a first electrode connected to the second node and a second electrode connected to an anode node and a fifth transistor including a control electrode configured to receive the initialization gate signal, a first electrode connected to the first node and a second electrode connected to the anode node. The first light emitting element may include a first electrode connected to the anode node and a second electrode configured to receive a second power voltage.

In an embodiment, the first pixel may further include a first capacitor including a first end configured to receive the first power voltage and a second end connected to the gate node and a second capacitor including a first end connected to the first node and a second end connected to the gate node.

In an embodiment, the initialization transistor may be connected to the first node of the first pixel.

In an embodiment, the emission signal may have an active level, the initialization gate signal may have an active level, the compensation gate signal may have an active level and the data writing gate signal may have an inactive level in a first period.

In an embodiment, the emission signal may have an inactive level, the initialization gate signal may have the active level, the compensation gate signal may have the active level and the data writing gate signal may have the inactive level in a second period subsequent to the first period.

In an embodiment, the emission signal may have the inactive level, the initialization gate signal may have an inactive level, the compensation gate signal may have an inactive level and the data writing gate signal may have an active level in a third period subsequent to the second period.

In an embodiment, the emission signal may have the active level, the initialization gate signal may have the inactive level, the compensation gate signal may have the inactive level and the data writing gate signal may have the inactive level in a fourth period subsequent to the third period.

In an embodiment, the initialization transistor may be connected to the gate node of the first pixel.

In an embodiment, the emission signal may have an active level, the initialization gate signal may have an active level, the compensation gate signal may have an active level and the data writing gate signal may have an inactive level in a first period.

In an embodiment, the emission signal may have an inactive level, the initialization gate signal may have an inactive level, the compensation gate signal may have the active level and the data writing gate signal may have the inactive level in a second period subsequent to the first period.

In an embodiment, the control electrode of the third transistor may be connected to the control electrode of the fifth transistor.

In an embodiment, the initialization gate signal may be the same as the compensation gate signal.

In an embodiment, the display panel may further include an emission transistor commonly connected to the first pixel and the second pixel, and configured to output a first power voltage to the first pixel and the second pixel in response to a second emission signal.

In an embodiment, the second emission signal may have an inactive level, the emission signal may have an active level, the initialization gate signal may have an active level, the compensation gate signal may have an active level and the data writing gate signal may have an inactive level in a first period.

In an embodiment, the second emission signal may have the inactive level, the emission signal may have an inactive level, the initialization gate signal may have the active level, the compensation gate signal may have the active level and the data writing gate signal may have the inactive level in a second period subsequent to the first period.

In an embodiment of a display apparatus according to the present inventive concept, the display apparatus includes a display panel, a gate driver, a data driver and an emission driver. The display panel includes a pixel. The gate driver is configured to output a gate signal to the pixel. The data driver is configured to output a data voltage to the pixel. The emission driver is configured to output an emission signal to the pixel. The display panel includes a first pixel including a first light emitting element configured to emit light based on a data writing gate signal, an initialization gate signal, a compensation gate signal, the emission signal and a first data voltage, a second pixel including a second light emitting element configured to emit light based on the data writing gate signal, the initialization gate signal, the compensation gate signal, the emission signal and a second data voltage and an initialization transistor commonly connected to the first pixel and the second pixel, and configured to output an initialization voltage to the first pixel and the second pixel in response to the initialization gate signal.

In an embodiment, the first pixel may further include a first transistor including a control electrode connected to a gate node, a first electrode configured to receive a first power voltage and a second electrode connected to a second node, a second transistor including a control electrode configured to receive the data writing gate signal, a first electrode configured to receive the first data voltage and a second electrode connected to a first node, a third transistor including a control electrode configured to receive the compensation gate signal, a first electrode connected to the gate node and a second electrode connected to the second node, a fourth transistor including a control electrode configured to receive the emission signal, a first electrode connected to the second node and a second electrode connected to an anode node and a fifth transistor including a control electrode configured to receive the initialization gate signal, a first electrode connected to the first node and a second electrode connected to the anode node. The first light emitting element may include a first electrode connected to the anode node and a second electrode configured to receive a second power voltage.

According to the display panel and the display apparatus including the display panel, the plurality of pixels may share one initialization transistor in the display panel. Thus, the pixel circuit may include fewer than six transistors (e.g., 5.33, 5.17, 5.11, 5.5, or 5.67) and two capacitors. The pixel circuit may operate internal compensation and have a relatively fewer transistors compared to the conventional pixel circuit, so that the high integration may be achieved. Thus, the pixel circuit may be applicable to an ultra-high resolution display apparatus.

In addition, in a driving timing of the pixel circuit, the data writing period may be separated from the initialization period and the threshold voltage compensation period so that one horizontal period may be longer compared to one horizontal period in a driving timing of the conventional pixel circuit. Therefore, it is easy to apply the demux circuit of the data driver for driving several data lines within one horizontal period.

In addition, a data range may be wider by reducing a slope of the current curve according to the voltage of the driving transistor of the pixel circuit.

BRIEF DESCRIPTION OF THE DRAWINGS

The above and other features and advantages of the inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
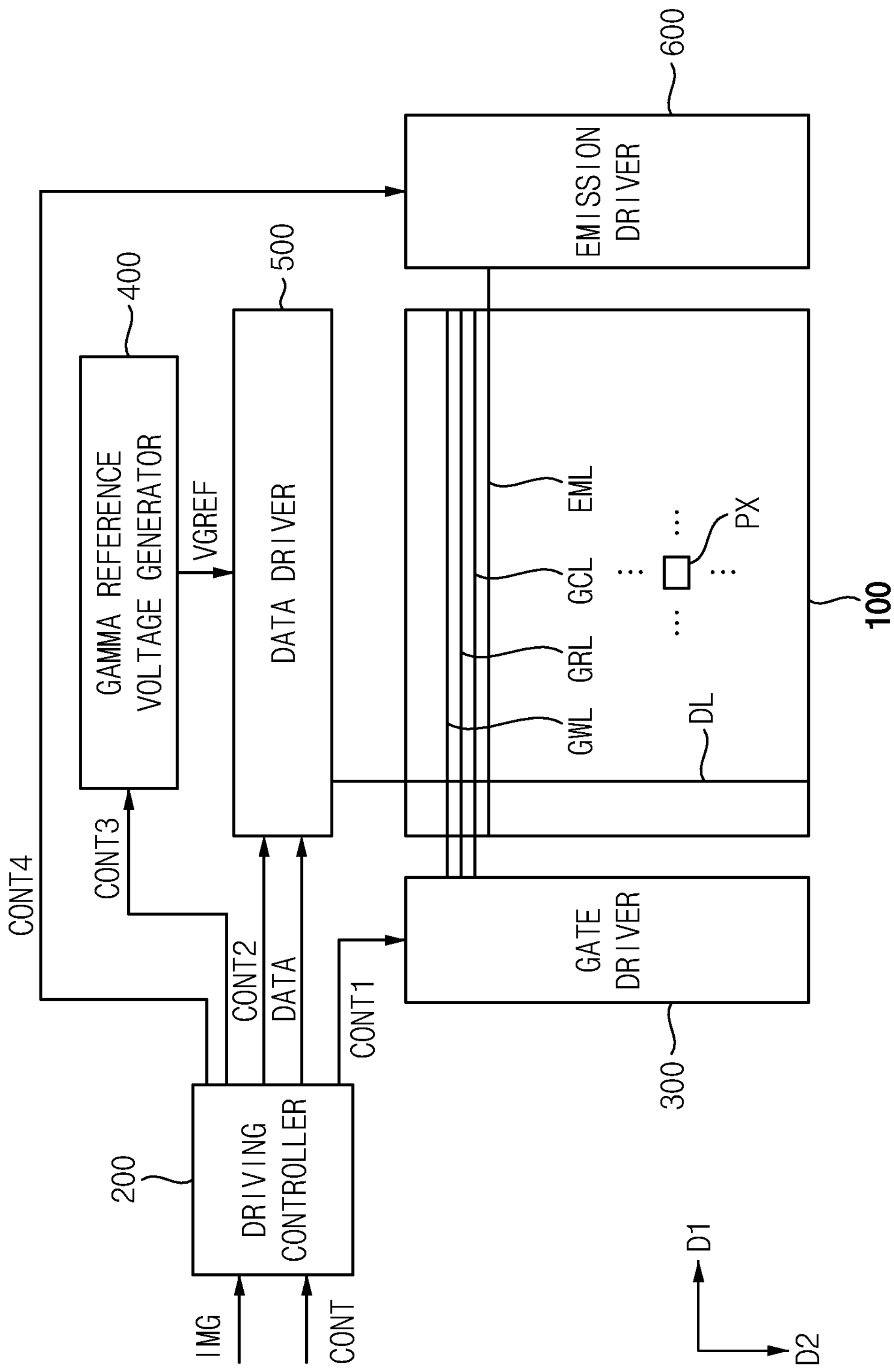
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region adjacent to the display region.

The display panel 100 includes a plurality of gate lines GWL, GRL and GCL, a plurality of data lines DL, a plurality of emission lines EML and a plurality of pixels PX electrically connected to the gate lines GWL, GRL and GCL, the data lines DL and the emission lines EML. The gate lines GWL, GRL and GCL may extend in a first direction D1, the data lines DL may extend in a second direction D2 crossing the first direction D1 and the emission lines EML may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GRL and GCL in response to the first control signal CONT1 received from the driving controller 200. The gate driver 300 may output the gate signals to the gate lines GWL, GRL and GCL. The gate signals may include a data initialization gate signal, a compensation gate signal and a data writing gate signal.

In an embodiment of the present inventive concept, the gate driver 300 may be integrated on the peripheral region of the display panel 100. In an embodiment of the present inventive concept, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

In an embodiment of the present inventive concept, the data driver 500 may be integrated on the peripheral region of the display panel 100. In an embodiment of the present inventive concept, the data driver 500 may be mounted on the peripheral region of the display panel 100.

The emission driver 600 generates emission signals to drive the emission lines EML in response to the fourth control signal CONT4 received from the driving controller 200. The emission driver 600 may output the emission signals to the emission lines EML.

In an embodiment of the present inventive concept, the emission driver 600 may be integrated on the peripheral region of the display panel 100. In an embodiment of the present inventive concept, the emission driver 600 may be mounted on the peripheral region of the display panel 100.

Although the gate driver 300 is illustrated to be disposed at a first side of the display panel 100 and the emission driver 600 is illustrated to be disposed at a second side of the display panel 100 opposite to the first side in FIG. 1 for convenience of explanation, the present inventive concept may not be limited thereto. For example, both of the gate driver 300 and the emission driver 600 may be disposed at the first side of the display panel 100. For example, both of the gate driver 300 and the emission driver 600 may be disposed at both sides of the display panel 100. For example, the gate driver 300 and the emission driver 600 may be integrally formed.

Figure 2:
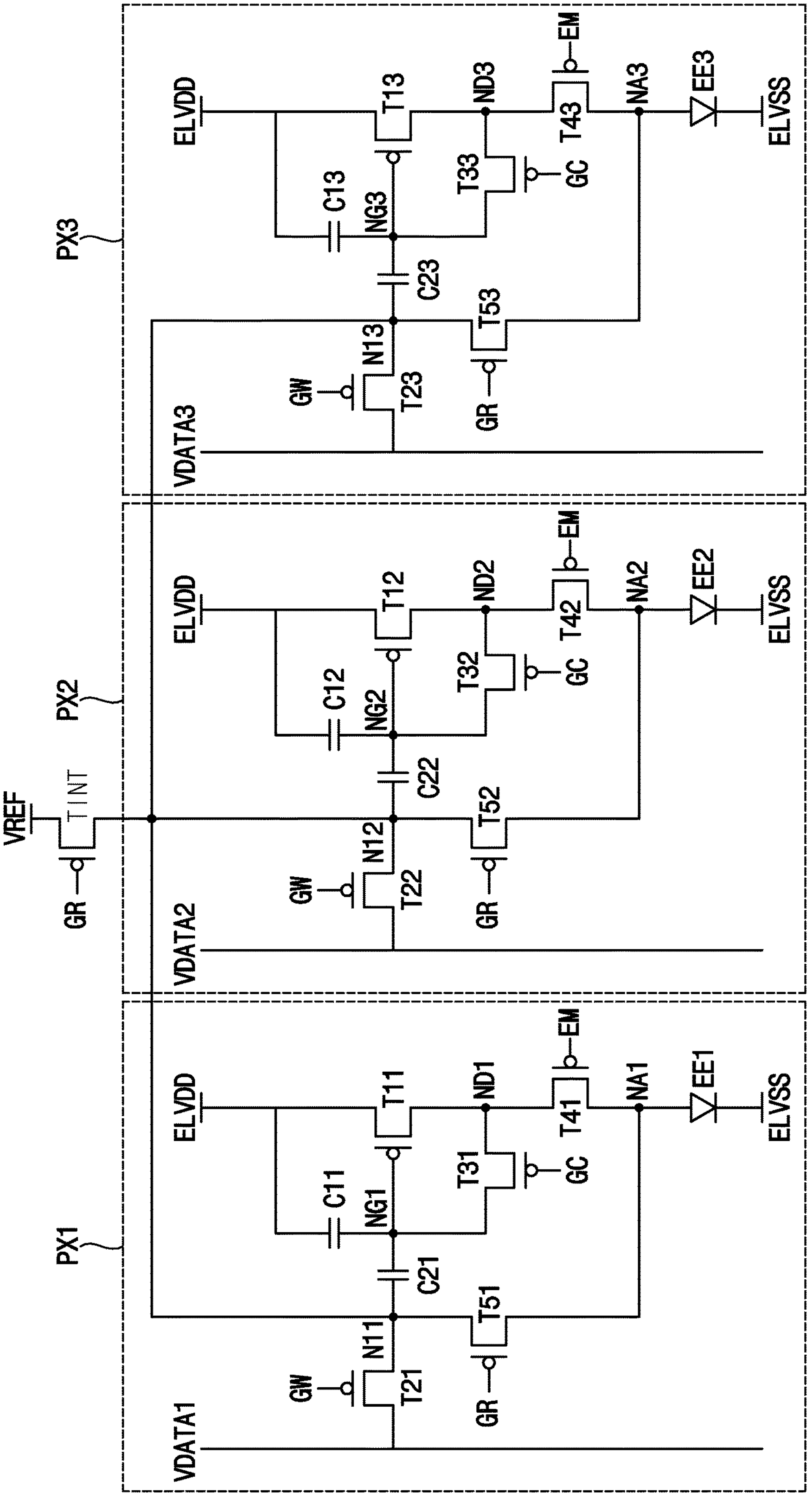
FIG. 2 is a circuit diagram illustrating pixels of the display panel of FIG. 1.

FIG. 2 is a circuit diagram illustrating pixels of the display panel 100 of FIG. 1.

Referring to FIGS. 1 and 2, the display panel 100 includes a first pixel PX1, a second pixel PX2 and an initialization transistor TINT. The first pixel PX1 may emit a first light emitting element EE1 based on a data writing gate signal GW, an initialization gate signal GR, a compensation gate signal GC, the emission signal EM and a first data voltage VDATA1. The second pixel PX2 may emit a second light emitting element EE2 based on the data writing gate signal GW, the initialization gate signal GR, the compensation gate signal GC, the emission signal EM and a second data voltage VDATA2.

The initialization transistor TINT is commonly connected to the first pixel PX1 and the second pixel PX2. The initialization transistor TINT outputs an initialization voltage VREF to the first pixel PX1 and the second pixel PX2 in response to the initialization gate signal GR.

In the present embodiment, the initialization transistor TINT may be commonly connected to three pixels PX1, PX2 and PX3.

The display panel 100 may further include a third pixel PX3 emitting a third light emitting element EE3 based on the data writing gate signal GW, the initialization gate signal GR, the compensation gate signal GC, the emission signal EM and a third data voltage VDATA3.

The initialization transistor TINT may be commonly connected to the first pixel PX1, the second pixel PX2 and the third pixel PX3. The initialization transistor TINT outputs the initialization voltage VREF to the first pixel PX1, the second pixel PX2 and the third pixel PX3 in response to the initialization gate signal GR.

The first pixel PX1 may include first to fifth transistors T11, T21, T31, T41 and T51 and first and second capacitors C11 and C21. The second pixel PX2 may include first to fifth transistors T12, T22, T32, T42 and T52 and first and second capacitors C12 and C22. The third pixel PX3 may include first to fifth transistors T13, T23, T33, T43 and T53 and first and second capacitors C13 and C23.

In the present embodiment, three pixels PX1, PX2 and PX3 each including five transistors share one initialization transistor TINT, so that it may be referred that one pixel includes 5.33 transistors.

For example, the first pixel PX1 may be a red pixel, the second pixel PX2 may be a green pixel and the third pixel PX3 may be a blue pixel. The first light emitting element EE1 may be a red light emitting element, the second light emitting element EE2 may be a green light emitting element and the third light emitting element EE3 may be a blue light emitting element. In the present embodiment, one red pixel, one green pixel and one blue pixel may share one initialization transistor TINT.

It is noted that in several places, pixel circuits are referred to as including a fractional component of a transistor. This reflects that a plurality of pixel circuits for a plurality of pixels share one or more transistors. So, in the above example, three pixels each including a pixel circuit have fifteen transistors for the three pixel circuits and a sixteenth transistor is shared be the three pixel circuits so that one pixel is referred to as including 5.33 transistors.

The present inventive concept may not be limited to a case in which three pixels share one initialization transistor. For example, six pixels (e.g. two red pixels, two green pixels and two blue pixels) may share one initialization transistor. In this case, six pixels each including five transistors share one initialization transistor TINT, so that it may be referred that one pixel includes 5.17 transistors. For example, nine pixels (e.g. three red pixels, three green pixels and three blue pixels) may share one initialization transistor. In this case, nine pixels each including five transistors share one initialization transistor TINT, so that it may be referred that one pixel includes 5.11 transistors.

In addition, the present inventive concept may not be limited to a case in which pixels in multiples of three share one initialization transistor. For example, two or more pixels may share one initialization transistor.

The first pixel PX1 may include a first transistor T11 including a control electrode connected to a gate node NG1, a first electrode receiving a first power voltage ELVDD and a second electrode connected to a second node ND1, a second transistor T21 including a control electrode receiving the data writing gate signal GW, a first electrode receiving the first data voltage VDATA1 and a second electrode connected to a first node N11, a third transistor T31 including a control electrode receiving the compensation gate signal GC, a first electrode connected to the gate node NG1 and a second electrode connected to the second node ND1, a fourth transistor T41 including a control electrode receiving the emission signal EM, a first electrode connected to the second node ND1 and a second electrode connected to an anode node NA1, a fifth transistor T51 including a control electrode receiving the initialization gate signal GR, a first electrode connected to the first node N11 and a second electrode connected to the anode node NA1 and a first light emitting element EE1 including a first electrode connected to the anode node NA1 and a second electrode receiving a second power voltage ELVSS.

The first pixel PX1 may further include a first capacitor C11 including a first end receiving the first power voltage ELVDD and a second end connected to the gate node NG1 and a second capacitor C21 including a first end connected to the first node N11 and a second end connected to the gate node NG1.

For example, the first power voltage ELVDD may be a high power voltage for determining a light emitting degree of the first light emitting element EE1. For example, the second power voltage ELVSS may be a low power voltage for determining a light emitting degree of the first light emitting element EE1. The first power voltage ELVDD may be greater than the second power voltage ELVSS.

The second pixel PX2 may be disposed adjacent to the first pixel PX1 in the first direction D1. The second pixel PX2 may include a first transistor T12 including a control electrode connected to a gate node NG2, a first electrode receiving the first power voltage ELVDD and a second electrode connected to a second node ND2, a second transistor T22 including a control electrode receiving the data writing gate signal GW, a first electrode receiving the second data voltage VDATA2 and a second electrode connected to a first node N12, a third transistor T32 including a control electrode receiving the compensation gate signal GC, a first electrode connected to the gate node NG2 and a second electrode connected to the second node ND2, a fourth transistor T42 including a control electrode receiving the emission signal EM, a first electrode connected to the second node ND2 and a second electrode connected to an anode node NA2, a fifth transistor T52 including a control electrode receiving the initialization gate signal GR, a first electrode connected to the first node N12 and a second electrode connected to the anode node NA2 and the second light emitting element EE2 including a first electrode connected to the anode node NA2 and a second electrode receiving the second power voltage ELVSS.

The second pixel PX2 may further include a first capacitor C12 including a first end receiving the first power voltage ELVDD and a second end connected to the gate node NG2 and a second capacitor C22 including a first end connected to the first node N12 and a second end connected to the gate node NG2.

The third pixel PX3 may be disposed adjacent to the second pixel PX2 in the first direction D1. The third pixel PX3 may include a first transistor T13 including a control electrode connected to a gate node NG3, a first electrode receiving the first power voltage ELVDD and a second electrode connected to a second node ND3, a second transistor T23 including a control electrode receiving the data writing gate signal GW, a first electrode receiving the third data voltage VDATA3 and a second electrode connected to a first node N13, a third transistor T33 including a control electrode receiving the compensation gate signal GC, a first electrode connected to the gate node NG3 and a second electrode connected to the second node ND3, a fourth transistor T43 including a control electrode receiving the emission signal EM, a first electrode connected to the second node ND3 and a second electrode connected to an anode node NA3, a fifth transistor T53 including a control electrode receiving the initialization gate signal GR, a first electrode connected to the first node N13 and a second electrode connected to the anode node NA3 and the third light emitting element EE3 including a first electrode connected to the anode node NA3 and a second electrode receiving the second power voltage ELVSS.

The third pixel PX3 may further include a first capacitor C13 including a first end receiving the first power voltage ELVDD and a second end connected to the gate node NG3 and a second capacitor C23 including a first end connected to the first node N13 and a second end connected to the gate node NG3.

In the present embodiment, the initialization transistor TINT may be connected to the first node N11 of the first pixel PX1. In addition, the initialization transistor TINT may be connected to the first node N12 of the second pixel PX2. In addition, the initialization transistor TINT may be connected to the first node N13 of the third pixel PX3.

Figure 3:
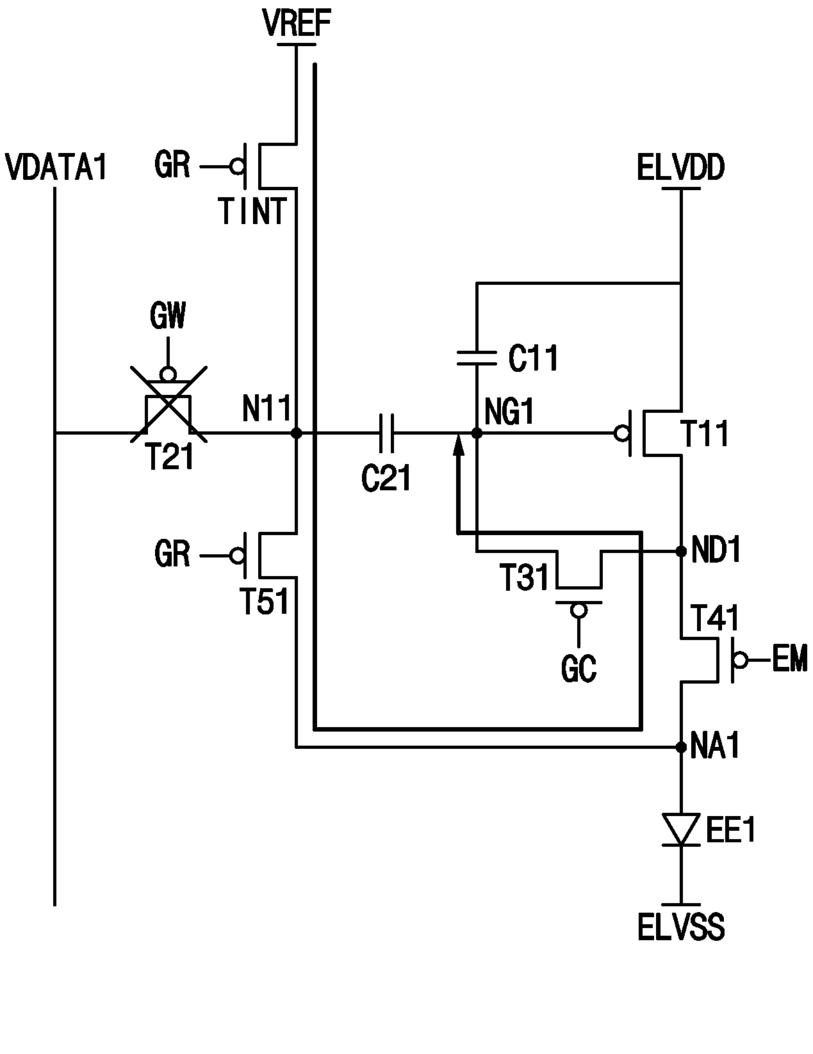
FIG. 3 is a circuit diagram illustrating an operation of a first pixel of FIG. 2 in a first period in a driving timing.
Figure 4:
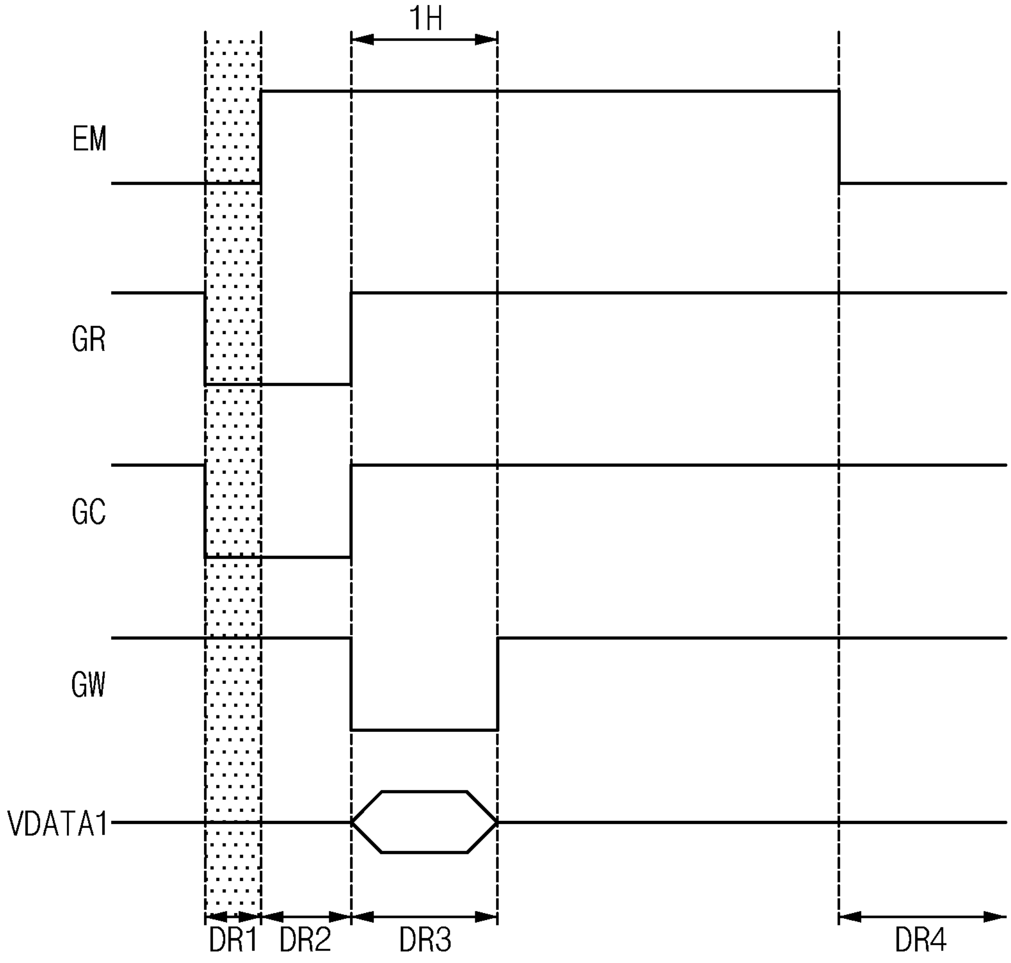
FIG. 4 is a timing diagram illustrating an example of input signals applied to the first pixel of FIG. 2 in the first period.
Figure 5:
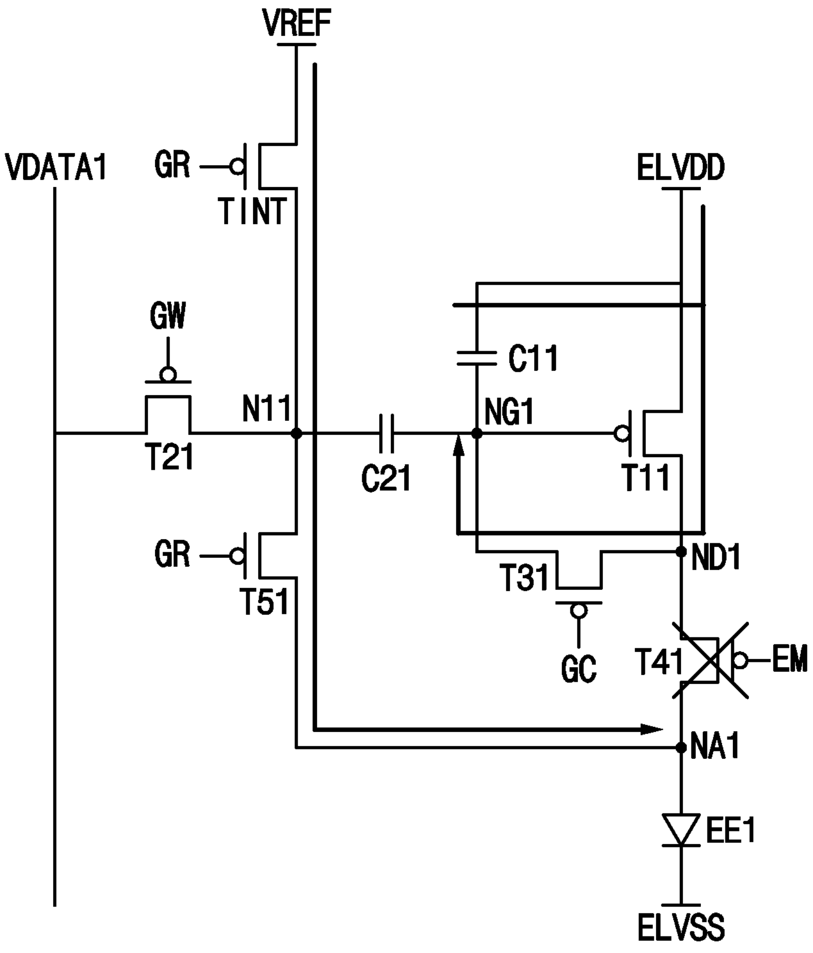
FIG. 5 is a circuit diagram illustrating an operation of the first pixel of FIG. 2 in a second period in the driving timing.
Figure 6:
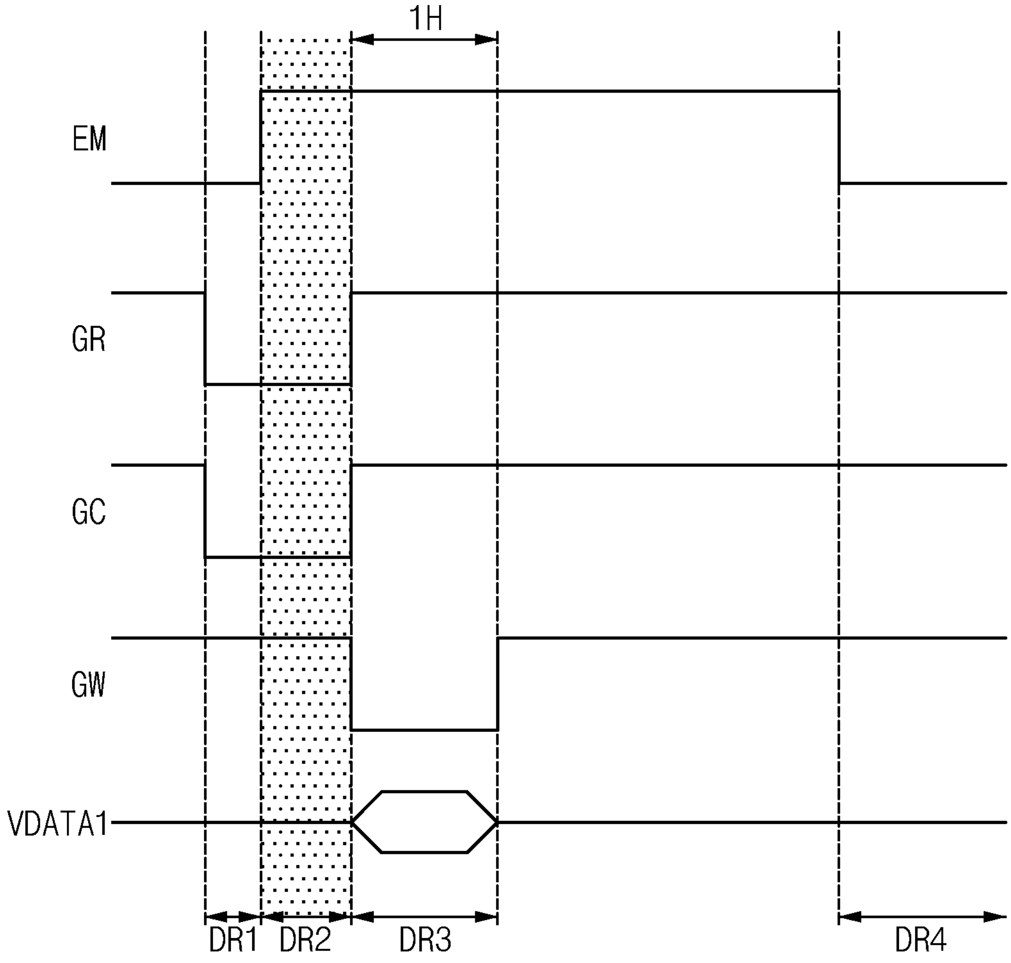
FIG. 6 is a timing diagram illustrating an example of input signals applied to the first pixel of FIG. 2 in the second period.
Figure 7:
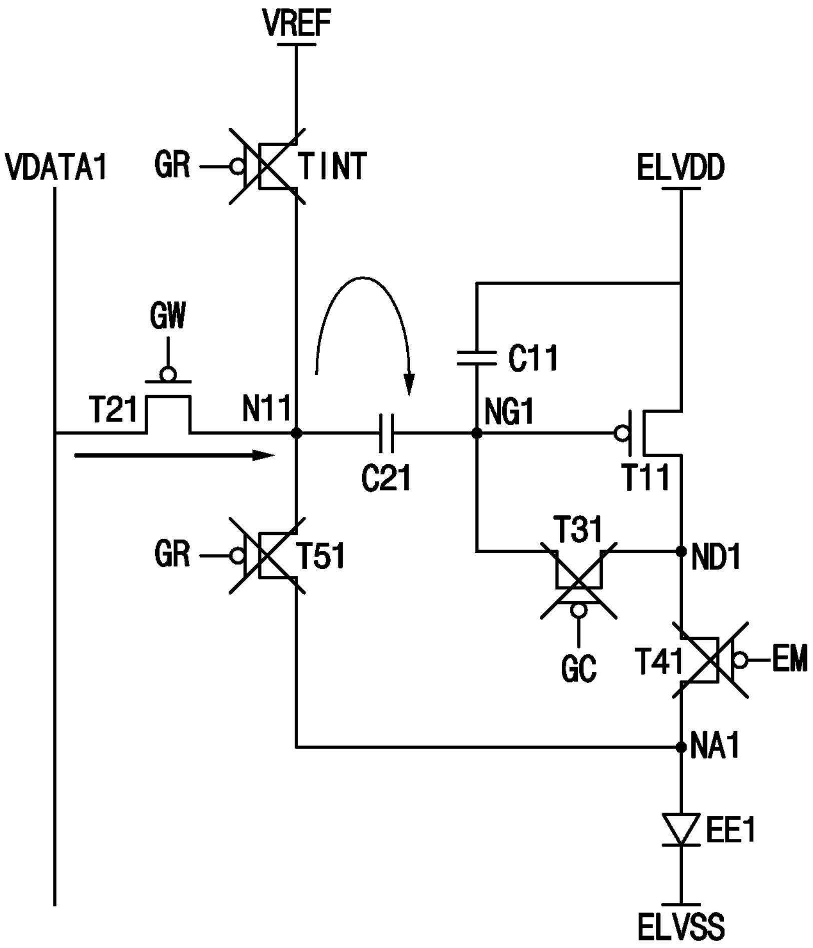
FIG. 7 is a circuit diagram illustrating an operation of the first pixel of FIG. 2 in a third period in the driving timing.
Figure 8:
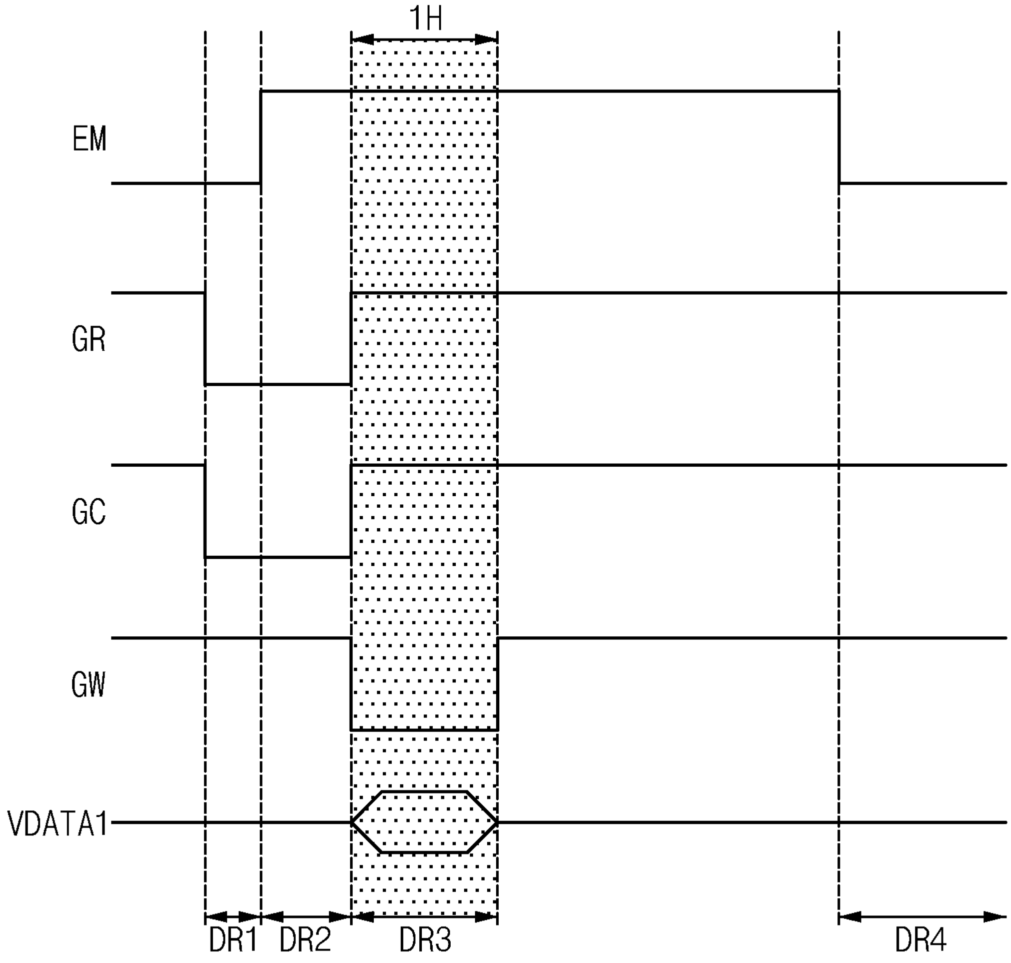
FIG. 8 is a timing diagram illustrating an example of input signals applied to the first pixel of FIG. 2 in the third period.
Figure 9:
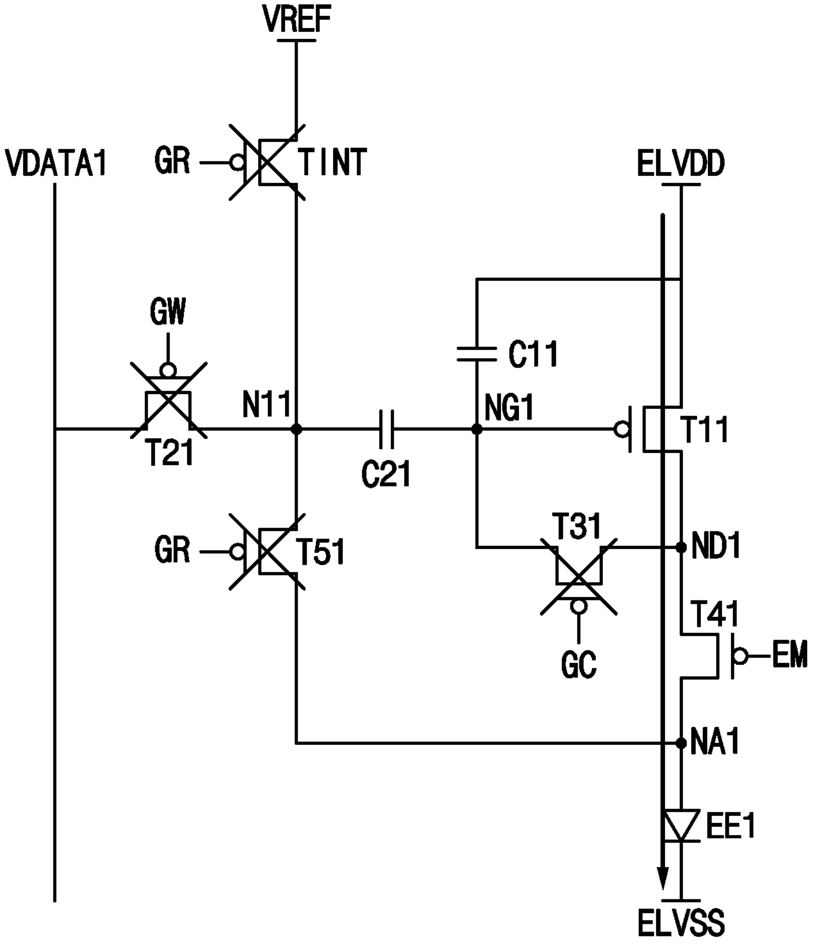
FIG. 9 is a circuit diagram illustrating an operation of the first pixel of FIG. 2 in a fourth period in the driving timing.
Figure 10:
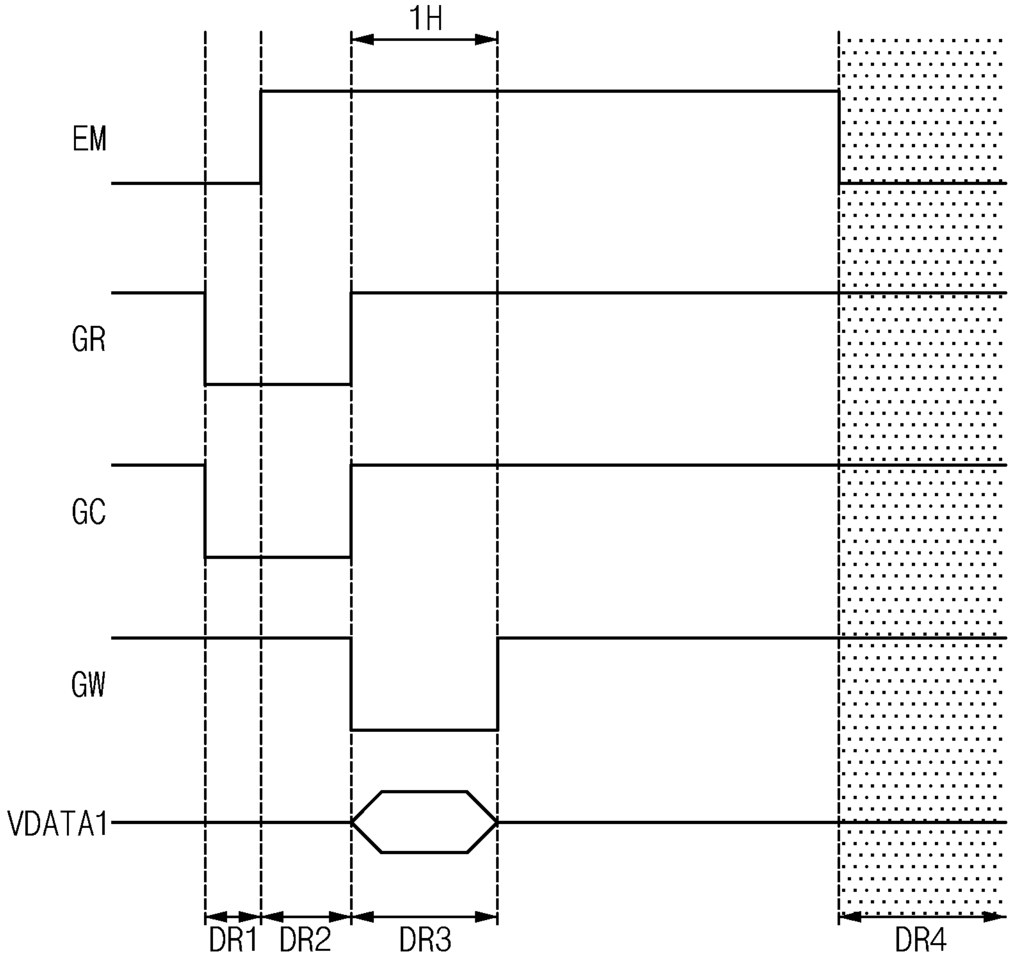
FIG. 10 is a timing diagram illustrating an example of input signals applied to the first pixel of FIG. 2 in the fourth period.

FIG. 3 is a circuit diagram illustrating an operation of a first pixel PX1 of FIG. 2 in a first period DR1 in a driving timing. FIG. 4 is a timing diagram illustrating an example of input signals applied to the first pixel PX1 of FIG. 2 in the first period DR1. FIG. 5 is a circuit diagram illustrating an operation of the first pixel PX1 of FIG. 2 in a second period DR2 in the driving timing. FIG. 6 is a timing diagram illustrating an example of input signals applied to the first pixel PX1 of FIG. 2 in the second period DR2. FIG. 7 is a circuit diagram illustrating an operation of the first pixel PX1 of FIG. 2 in a third period DR3 in the driving timing. FIG. 8 is a timing diagram illustrating an example of input signals applied to the first pixel PX1 of FIG. 2 in the third period DR3. FIG. 9 is a circuit diagram illustrating an operation of the first pixel PX1 of FIG. 2 in a fourth period DR4 in the driving timing. FIG. 10 is a timing diagram illustrating an example of input signals applied to the first pixel PX1 of FIG. 2 in the fourth period DR4.

Hereinafter, the driving timing of the display panel 100 is explained in detail referring to FIGS. 3 to 10. The first period DR1 explained referring to FIGS. 3 and 4 may be an initialization period. The second period DR2 explained referring to FIGS. 5 and 6 may be a threshold voltage compensation period. The third period DR3 explained referring to FIGS. 7 and 8 may be a data writing period. The fourth period DR4 explained referring to FIGS. 9 and 10 may be a light emitting period.

In FIGS. 3 to 10, an operation of the circuit of the first pixel PX1 is explained. The operation of the circuit of the second pixel PX2 and the operation of the circuit of the third pixel PX3 are substantially the same as the operation of the circuit of the first pixel PX1.

Referring to FIGS. 1 to 10, in the driving timing of the display panel 100, the data writing period DR3 may be separated from the initialization period DR1 and the threshold voltage compensation period DR2 so that one horizontal period may be longer compared to one horizontal period in a driving timing of the conventional pixel circuit.

Referring to FIGS. 3 and 4, in the first period DR1, the emission signal EM may have an active level, the initialization gate signal GR may have an active level, the compensation gate signal GC may have an active level and the data writing gate signal GW may have an inactive level.

For example, the display panel 100 may include p-type transistors. Thus, inactive levels of the emission signal EM, the initialization gate signal GR, the compensation gate signal GC and the data writing gate signal GW may be a high level. Active levels of the emission signal EM, the initialization gate signal GR, the compensation gate signal GC and the data writing gate signal GW may be a low level.

The present inventive concept may not be limited thereto, when the display panel 100 includes n-type transistors, inactive levels of the emission signal EM, the initialization gate signal GR, the compensation gate signal GC and the data writing gate signal GW may be a low level and active levels of the emission signal EM, the initialization gate signal GR, the compensation gate signal GC and the data writing gate signal GW may be a high level.

In the first period DR1, the initialization gate signal GR has the active level so that the initialization transistor TINT is turned on by the initialization gate signal GR and the first node N11 may be initialized to the initialization voltage VREF. In addition, the fifth transistor T51 is turned on by the initialization gate signal GR so that the anode node NA1 may be initialized to the initialization voltage VREF.

In addition, in the first period DR1, the compensation gate signal GC and the emission signal EM have the active levels so that the third transistor T31 is turned on by the compensation gate signal GC and the fourth transistor T41 is turned on by the emission signal EM, and thus, the gate node NG1 may be initialized to the initialization voltage VREF.

In this case, the first transistor T11 may also be turned on by the voltage applied to the gate node NG1, and accordingly, the first power voltage ELVDD may also be applied to the second node ND1, the anode node NA1 and the gate node NG1. However, in the first period DR1, the initialization voltage VREF is applied to the second node ND1, the anode node NA1 and the gate node NG1 by the initialization transistor TINT, the fifth transistor T51, the fourth transistor T41 and the third transistor T31 and the first transistor T11 is turned on relatively later than the other transistors, so that the second node ND1, the anode node NA1, and the gate node NG1 may be initialized to a value close to the initialization voltage VREF.

Referring to FIGS. 5 and 6, in the second period DR2 subsequent to the first period DR1, the emission signal EM may have the inactive level, the initialization gate signal GR may have the active level, the compensation gate signal GC may have the active level and the data writing gate signal GW may have the inactive level.

In the second period DR2, the first transistor T11 may be turned on by the initialization voltage VREF and the third transistor T31 may be turned on by the compensation gate signal GC.

The first power voltage ELVDD is applied to the first end of the first capacitor C11 and the voltage of the second end of the first capacitor C11 is a sum of the first power voltage ELVDD and the threshold voltage Vth of the first transistor T11, so that the threshold voltage Vth of the first transistor T11 may be stored in the first capacitor C11.

In the second period DR2, the initialization transistor TINT and the fifth transistor T51 are turned on by the initialization gate signal GR so that the first node N11 and the anode node NA1 may be continuously initialized to the initialization voltage VREF.

Referring to FIGS. 7 and 8, in the third period DR3 subsequent to the second period DR2, the emission signal EM may have the inactive level, the initialization gate signal GR may have the inactive level, the compensation gate signal GC may have the inactive level and the data writing gate signal GW may have the active level.

In the third period DR3, the second transistor T21 may be turned on by the data writing gate signal GW. At this time, the first data voltage VDATA1 may be applied to the gate node NG1 through the second capacitor C21 in a bootstrap manner.

In the third period DR3, the voltage of the gate node NG1 may be ELVDD+Vth+VDATA1.

Referring to FIGS. 9 and 10, in the fourth period DR4 subsequent to the third period DR3, the emission signal EM may have the active level, the initialization gate signal GR may have the inactive level, the compensation gate signal GC may have the inactive level and the data writing gate signal GW may have the inactive level.

In the fourth period DR4, the first transistor T11 may be turned on by the first data voltage VDATA1 and the fourth transistor T41 may be turned on by the emission signal EM.

In the fourth period DR4, a current flows through a path of the first transistor T11, the fourth transistor T41 and the first light emitting element EE1 so that the first light emitting element EE1 emits light. A light emitting degree of the first light emitting element EE1 may be determined by a gate-source voltage of the first transistor T11.

The current flowing through the first light emitting element EE1 does not have the Vth component, so that it may be referred that the threshold voltage Vth of the first transistor T11 is compensated in the display panel 100.

According to the present embodiment, the plurality of pixels may share one initialization transistor TINT in the display panel 100. Thus, the pixel circuit may include fewer than six transistors (e.g., 5.33) and two capacitors. The pixel circuit may operate internal compensation and have a relatively fewer transistors compared to the conventional pixel circuit, so that the high integration may be achieved. Thus, the pixel circuit may be applicable to an ultra-high resolution display apparatus.

In addition, in a driving timing of the pixel circuit, the data writing period DR3 may be separated from the initialization period DR1 and the threshold voltage compensation period DR2 so that one horizontal period may be longer compared to one horizontal period in a driving timing of the conventional pixel circuit. Therefore, it is easy to apply the demux circuit of the data driver 500 for driving several data lines within one horizontal period.

In addition, a data range may be wider by reducing a slope of the current curve according to the voltage of the driving transistor T11, T12 and T13 of the pixel circuit.

Figure 11:
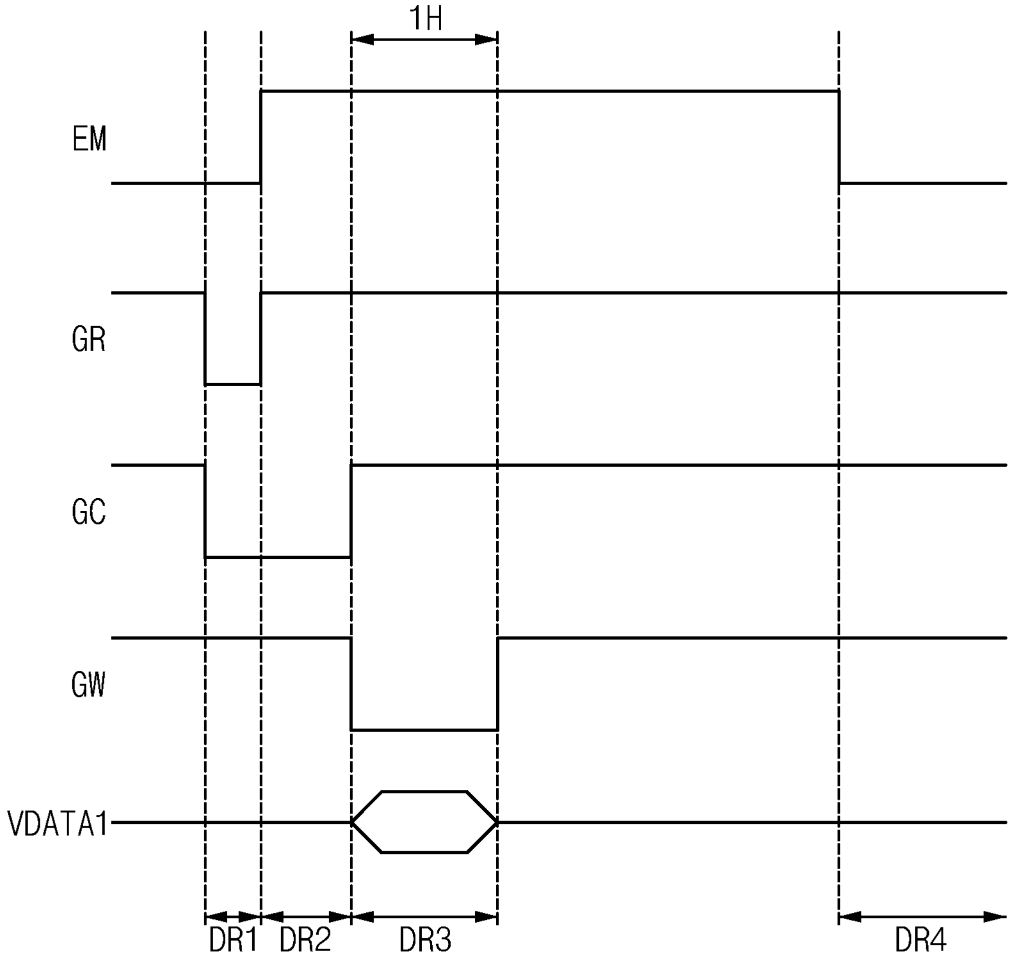
FIG. 11 is a timing diagram illustrating an example of input signals applied to the first pixel of FIG. 2 according to an embodiment of the present inventive concept.

FIG. 11 is a timing diagram illustrating an example of input signals applied to the first pixel PX1 of FIG. 2 according to an embodiment of the present inventive concept.

The display panel according to the present embodiment is substantially the same as the display panel of the previous embodiment explained referring to FIG. 2 and the driving timing according to the present embodiment is different from the driving timing of the previous embodiment explained referring to FIGS. 4, 6, 8 and 10. The driving timing according to the present embodiment is substantially the same as the driving timing of the previous embodiment explained referring to FIGS. 4, 6, 8 and 10 except for the second period. Thus, the same reference numerals will be used to refer to the same or like parts as those described in the previous embodiment of FIGS. 1 to 10 and any repetitive explanation concerning the above elements will be omitted.

Referring to FIGS. 1, 2 and 11, the display panel 100 includes a first pixel PX1, a second pixel PX2 and an initialization transistor TINT. The first pixel PX1 may emit a first light emitting element EE1 based on a data writing gate signal GW, an initialization gate signal GR, a compensation gate signal GC, the emission signal EM and a first data voltage VDATA1. The second pixel PX2 may emit a second light emitting element EE2 based on the data writing gate signal GW, the initialization gate signal GR, the compensation gate signal GC, the emission signal EM and a second data voltage VDATA2.

The initialization transistor TINT is commonly connected to the first pixel PX1 and the second pixel PX2. The initialization transistor TINT outputs an initialization voltage VREF to the first pixel PX1 and the second pixel PX2 in response to the initialization gate signal GR.

In FIG. 11, the first period DR1 may be the initialization period, the second period DR2 may be the threshold voltage compensation period, the third period DR3 may be the data writing period and the fourth period DR4 may be the light emitting period.

In the first period DR1, the emission signal EM may have the active level, the initialization gate signal GR may have the active level, the compensation gate signal GC may have the active level and the data writing gate signal GW may have the inactive level.

In the second period DR2 subsequent to the first period DR1, the emission signal EM may have the inactive level, the initialization gate signal GR may have the inactive level, the compensation gate signal GC may have the active level and the data writing gate signal GW may have the inactive level.

In the present embodiment, in the second period DR2, the initialization gate signal GR has the inactive level so that the initialization transistor TINT and the fifth transistor T51 may be turned off in the second period DR2.

In the third period DR3 subsequent to the second period DR2, the emission signal EM may have the inactive level, the initialization gate signal GR may have the inactive level, the compensation gate signal GC may have the inactive level and the data writing gate signal GW may have the active level.

In the fourth period DR4 subsequent to the third period DR3, the emission signal EM may have the active level, the initialization gate signal GR may have the inactive level, the compensation gate signal GC may have the inactive level and the data writing gate signal GW may have the inactive level.

According to the present embodiment, the plurality of pixels may share one initialization transistor TINT in the display panel 100. Thus, the pixel circuit may include fewer than six transistors (e.g., 5.33) and two capacitors. The pixel circuit may operate internal compensation and have a relatively fewer transistors compared to the conventional pixel circuit, so that the high integration may be achieved. Thus, the pixel circuit may be applicable to an ultra-high resolution display apparatus.

In addition, in a driving timing of the pixel circuit, the data writing period DR3 may be separated from the initialization period DR1 and the threshold voltage compensation period DR2 so that one horizontal period may be longer compared to one horizontal period in a driving timing of the conventional pixel circuit. Therefore, it is easy to apply the demux circuit of the data driver 500 for driving several data lines within one horizontal period.

In addition, a data range may be wider by reducing a slope of the current curve according to the voltage of the driving transistor T11, T12 and T13 of the pixel circuit.

Figure 12:
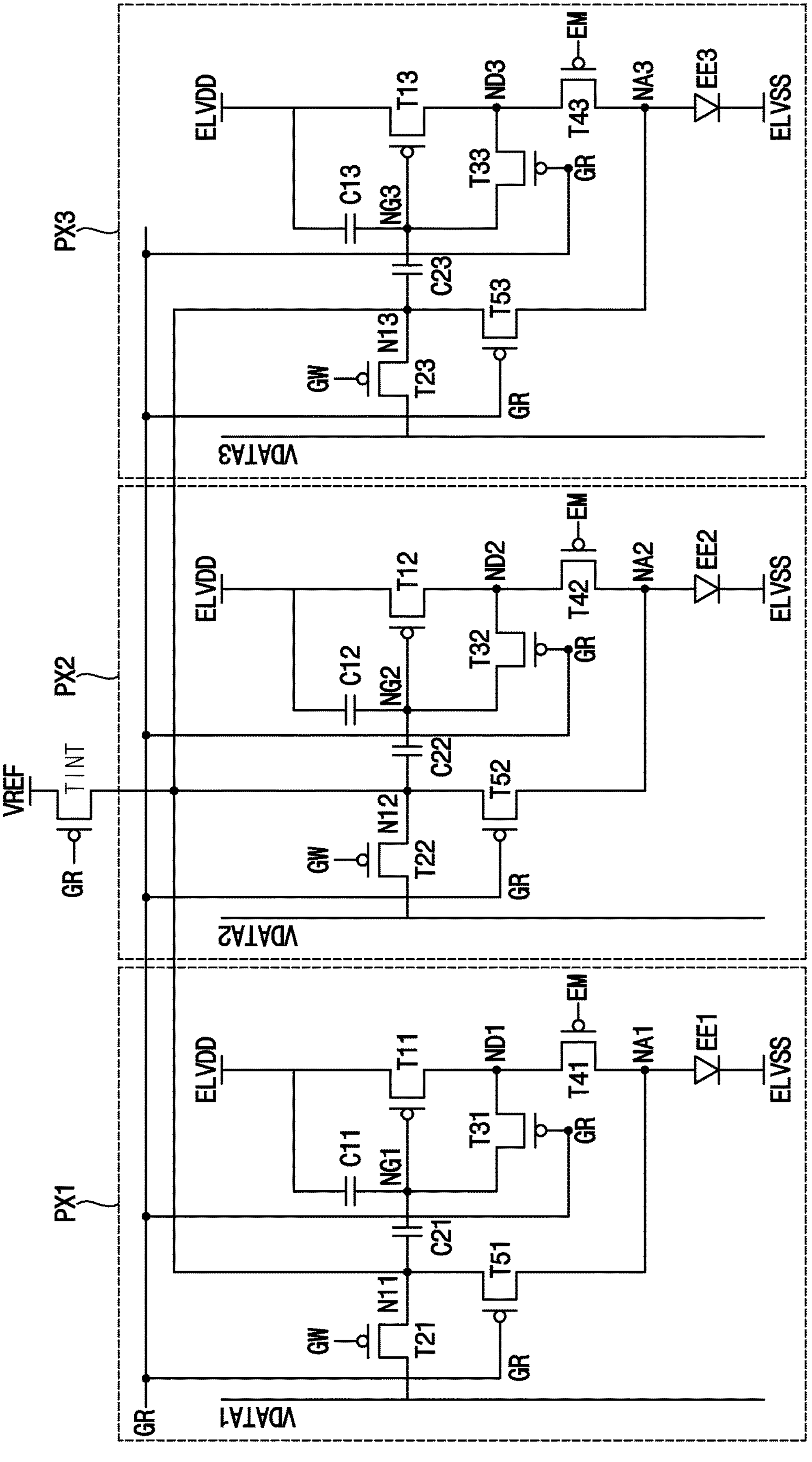
FIG. 12 is a circuit diagram illustrating pixels of a display panel of a display apparatus according to an embodiment of the present inventive concept.
Figure 13:
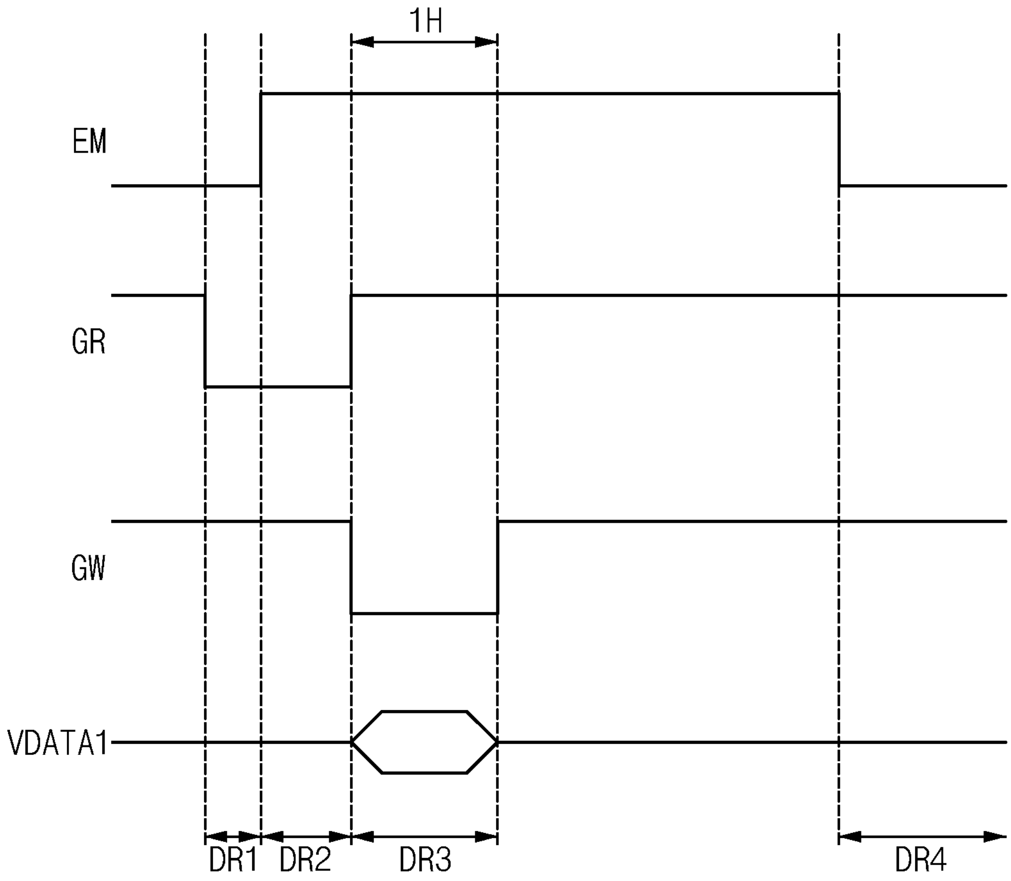
FIG. 13 is a timing diagram illustrating an example of input signals applied to a first pixel of FIG. 12.

FIG. 12 is a circuit diagram illustrating pixels of a display panel 100 of a display apparatus according to an embodiment of the present inventive concept. FIG. 13 is a timing diagram illustrating an example of input signals applied to a first pixel of FIG. 12.

The display panel according to the present embodiment is substantially the same as the display panel of the previous embodiment explained referring to FIG. 2 except that the control electrode of the third transistor T31, T32 and T33 is connected to the control electrode of the fifth transistor T51, T52 and T53 and the driving timing according to the present embodiment is substantially the same as the driving timing of the previous embodiment explained referring to FIGS. 4, 6, 8 and 10 except that the initialization gate signal GR and the compensation gate signal GC are integrated into one signal. Thus, the same reference numerals will be used to refer to the same or like parts as those described in the previous embodiment of FIGS. 1 to 10 and any repetitive explanation concerning the above elements will be omitted.

Referring to FIGS. 1, 12 and 13, the display panel 100 includes a first pixel PX1, a second pixel PX2 and an initialization transistor TINT. The first pixel PX1 may emit a first light emitting element EE1 based on a data writing gate signal GW, an initialization gate signal GR, the emission signal EM and a first data voltage VDATA1. The second pixel PX2 may emit a second light emitting element EE2 based on the data writing gate signal GW, the initialization gate signal GR, the emission signal EM and a second data voltage VDATA2.

The initialization transistor TINT is commonly connected to the first pixel PX1 and the second pixel PX2. The initialization transistor TINT outputs an initialization voltage VREF to the first pixel PX1 and the second pixel PX2 in response to the initialization gate signal GR.

The first pixel PX1 may include a first transistor T11 including a control electrode connected to a gate node NG1, a first electrode receiving a first power voltage ELVDD and a second electrode connected to a second node ND1, a second transistor T21 including a control electrode receiving the data writing gate signal GW, a first electrode receiving the first data voltage VDATA1 and a second electrode connected to a first node N11, a third transistor T31 including a control electrode receiving the initialization gate signal GR, a first electrode connected to the gate node NG1 and a second electrode connected to the second node ND1, a fourth transistor T41 including a control electrode receiving the emission signal EM, a first electrode connected to the second node ND1 and a second electrode connected to an anode node NA1, a fifth transistor T51 including a control electrode receiving the initialization gate signal GR, a first electrode connected to the first node N11 and a second electrode connected to the anode node NA1 and a first light emitting element EE1 including a first electrode connected to the anode node NA1 and a second electrode receiving a second power voltage ELVSS.

In the present embodiment, the control electrode of the third transistor T31 of the first pixel PX1 may be connected to the control electrode of the fifth transistor T51 of the first pixel PX1.

In addition, the control electrode of the third transistor T32 of the second pixel PX2 may be connected to the control electrode of the fifth transistor T52 of the second pixel PX2.

In the present embodiment, the control electrode of the third transistor T33 of the third pixel PX3 may be connected to the control electrode of the fifth transistor T53 of the third pixel PX3.

In the present embodiment, the initialization gate signal and the compensation gate signal may be the same signal.

As shown in the driving timings of FIGS. 4, 6, 8 and 10, a width of the active pulse of the initialization gate signal GR and a width of the active pulse of the compensation gate signal GC are the same and a timing of the active pulse of the initialization gate signal GR and a timing of the active pulse of the compensation gate signal GC are the same. Thus, the compensation gate signal GC may be replaced with the initialization gate signal GR in the present embodiment. In this case, a circuit for generating the compensation gate signal GC in the gate driver 300 may be omitted so that a cost of manufacturing the gate driver 300 may be reduced. In addition, when the gate driver is mounted or integrated on the display panel 100, a dead space of the display panel 100 may be reduced. In addition, a line for applying the compensation gate signal GC may be omitted so that an integration of the display panel 100 may be enhanced.

According to the present embodiment, the plurality of pixels may share one initialization transistor TINT in the display panel 100. Thus, the pixel circuit may include fewer than six transistors (e.g., 5.33) and two capacitors. The pixel circuit may operate internal compensation and have a relatively fewer transistors compared to the conventional pixel circuit, so that the high integration may be achieved. Thus, the pixel circuit may be applicable to an ultra-high resolution display apparatus.

In addition, in a driving timing of the pixel circuit, the data writing period DR3 may be separated from the initialization period DR1 and the threshold voltage compensation period DR2 so that one horizontal period may be longer compared to one horizontal period in a driving timing of the conventional pixel circuit. Therefore, it is easy to apply the demux circuit of the data driver 500 for driving several data lines within one horizontal period.

In addition, a data range may be wider by reducing a slope of the current curve according to the voltage of the driving transistor T11, T12 and T13 of the pixel circuit.

Figure 14:
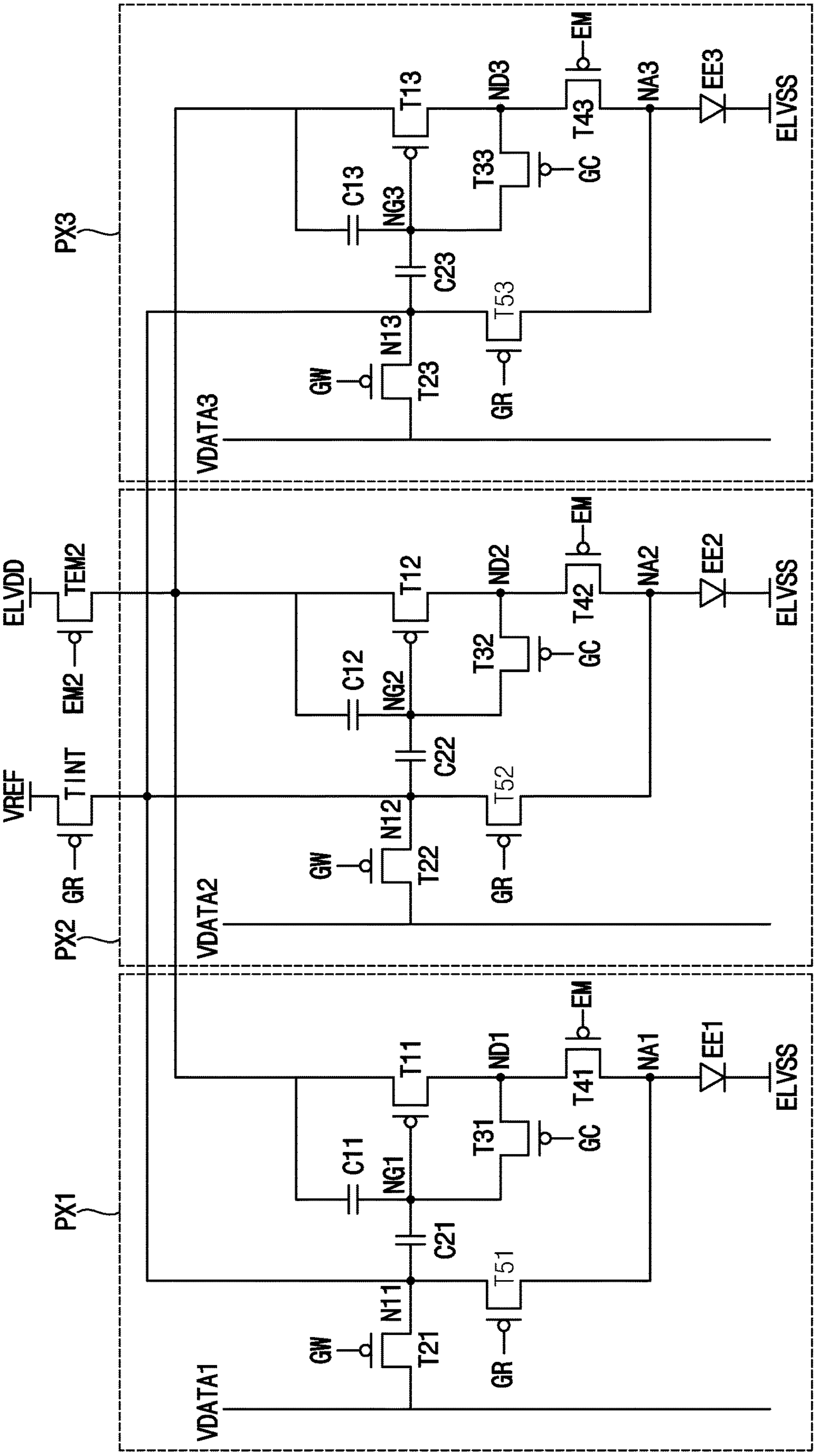
FIG. 14 is a circuit diagram illustrating pixels of a display panel of a display apparatus according to an embodiment of the present inventive concept.
Figure 15:
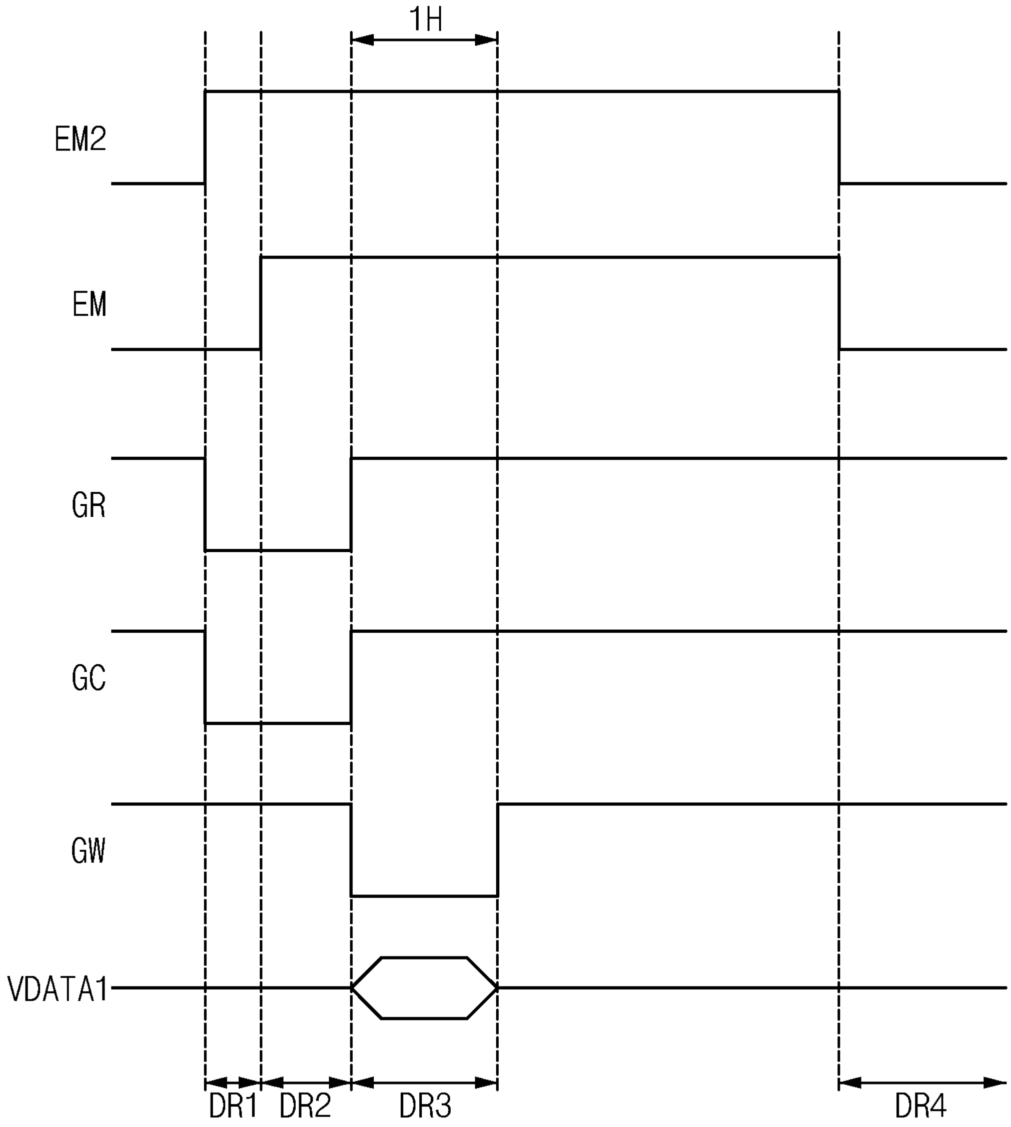
FIG. 15 is a timing diagram illustrating an example of input signals applied to a first pixel of FIG. 14.

FIG. 14 is a circuit diagram illustrating pixels of a display panel 100 of a display apparatus according to an embodiment of the present inventive concept. FIG. 15 is a timing diagram illustrating an example of input signals applied to a first pixel of FIG. 14.

The display panel according to the present embodiment is substantially the same as the display panel of the previous embodiment explained referring to FIG. 2 except that the display panel further includes an emission transistor. The driving timing according to the present embodiment is substantially the same as the driving timing of the previous embodiment explained referring to FIGS. 4, 6, 8 and 10 except that a second emission signal is further applied to the display panel. Thus, the same reference numerals will be used to refer to the same or like parts as those described in the previous embodiment of FIGS. 1 to 10 and any repetitive explanation concerning the above elements will be omitted.

Referring to FIGS. 1, 14 and 15, the display panel 100 includes a first pixel PX1, a second pixel PX2 and an initialization transistor TINT. The first pixel PX1 may emit a first light emitting element EE1 based on a data writing gate signal GW, an initialization gate signal GR, a compensation gate signal GC, the emission signal EM and a first data voltage VDATA1. The second pixel PX2 may emit a second light emitting element EE2 based on the data writing gate signal GW, the initialization gate signal GR, the compensation gate signal GC, the emission signal EM and a second data voltage VDATA2.

The initialization transistor TINT is commonly connected to the first pixel PX1 and the second pixel PX2. The initialization transistor TINT outputs an initialization voltage VREF to the first pixel PX1 and the second pixel PX2 in response to the initialization gate signal GR.

The display panel 100 may further include an emission transistor TEM2 commonly connected to the first pixel PX1 and the second pixel PX2. The emission transistor TEM2 may output a first power voltage ELVDD to the first pixel PX1 and the second pixel PX2 in response to a second emission signal EM2.

In the present embodiment, the initialization transistor TINT may be commonly connected to three pixels PX1, PX2 and PX3. In addition, the emission transistor TEM2 may be commonly connected to three pixels PX1, PX2 and PX3.

Although the number of pixels commonly connected to the initialization transistor TINT and the number of pixels commonly connected to the emission transistor TEM2 are the same in the present embodiment, the present inventive concept may not be limited thereto. Alternatively, the number of pixels commonly connected to the initialization transistor TINT and the number of pixels commonly connected to the emission transistor TEM2 may be different from each other.

In the present embodiment, three pixels PX1, PX2 and PX3 each including five transistors share one initialization transistor TINT and one emission transistor TEM2, so that it may be referred that one pixel includes 5.67 transistors.

In FIG. 15, the first period DR1 may be the initialization period, the second period DR2 may be the threshold voltage compensation period, the third period DR3 may be the data writing period and the fourth period DR4 may be the light emitting period.

In the first period DR1, the second emission signal EM2 may have the inactive level, the emission signal EM may have the active level, the initialization gate signal GR may have the active level, the compensation gate signal GC may have the active level and the data writing gate signal GW may have the inactive level.

In the first period DR1, the initialization gate signal GR has the active level so that the initialization transistor TINT is turned on by the initialization gate signal GR and the first node N11 may be initialized to the initialization voltage VREF. In addition, the fifth transistor T51 is turned on by the initialization gate signal GR so that the anode node NA1 may be initialized to the initialization voltage VREF.

In addition, in the first period DR1, the compensation gate signal GC and the emission signal EM have the active levels so that the third transistor T31 is turned on by the compensation gate signal GC and the fourth transistor T41 is turned on by the emission signal EM, and thus, the gate node NG1 may be initialized to the initialization voltage VREF.

In this case, the first transistor T11 may also be turned on by the voltage applied to the gate node NG1. In the embodiment of FIG. 4, when the first transistor T11 is turned on, the first power voltage ELVDD may be applied to the second node ND1, the anode node NA1 and the gate node NG1 so that the initialization performance may decrease.

In the present embodiment, the second emission signal EM2 has the inactive level in the first period DR1 so that the emission transistor TEM2 is turned off in the first period DR1. Thus, although the first transistor T11 is turned on in the first period DR1, the first power voltage ELVDD is not applied to the second node ND1, the anode node NA1 and the gate node NG1 so that the initialization performance may be enhanced.

In the second period DR2 subsequent to the first period DR1, the second emission signal EM2 may have the inactive level, the emission signal EM may have the inactive level, the initialization gate signal GR may have the active level, the compensation gate signal GC may have the active level and the data writing gate signal GW may have the inactive level.

In the third period DR3 subsequent to the second period DR2, the second emission signal EM2 may have the inactive level, the emission signal EM may have the inactive level, the initialization gate signal GR may have the inactive level, the compensation gate signal GC may have the inactive level and the data writing gate signal GW may have the active level.

In the fourth period DR4 subsequent to the third period DR3, the second emission signal EM2 may have the active level, the emission signal EM may have the active level, the initialization gate signal GR may have the inactive level, the compensation gate signal GC may have the inactive level and the data writing gate signal GW may have the inactive level.

In the fourth period DR4, the first transistor T11 may be turned on by the first data voltage VDATA1 the emission transistor TEM2 may be turned on by the second emission signal EM2 and the fourth transistor T41 may be turned on by the emission signal EM.

In the fourth period DR4, a current flows through a path of the emission transistor TEM2, the first transistor T11, the fourth transistor T41 and the first light emitting element EE1 so that the first light emitting element EE1 emits a light. A light emitting degree of the first light emitting element EE1 may be determined by a gate-source voltage of the first transistor T11.

According to the present embodiment, the plurality of pixels may share one initialization transistor TINT and one emission transistor TEM2 in the display panel 100. Thus, the pixel circuit may include fewer than six transistors (e.g., 5.67) and two capacitors. The pixel circuit may operate internal compensation and have a relatively fewer transistors compared to the conventional pixel circuit, so that the high integration may be achieved. Thus, the pixel circuit may be applicable to an ultra-high resolution display apparatus.

In addition, in a driving timing of the pixel circuit, the data writing period DR3 may be separated from the initialization period DR1 and the threshold voltage compensation period DR2 so that one horizontal period may be longer compared to one horizontal period in a driving timing of the conventional pixel circuit. Therefore, it is easy to apply the demux circuit of the data driver 500 for driving several data lines within one horizontal period.

In addition, a data range may be wider by reducing a slope of the current curve according to the voltage of the driving transistor T11, T12 and T13 of the pixel circuit.

In addition, the first power voltage ELVDD is blocked by the emission transistor TEM2 in the initialization period DR1 so that the initialization performance of the display panel 100 may be enhanced.

Figure 16:
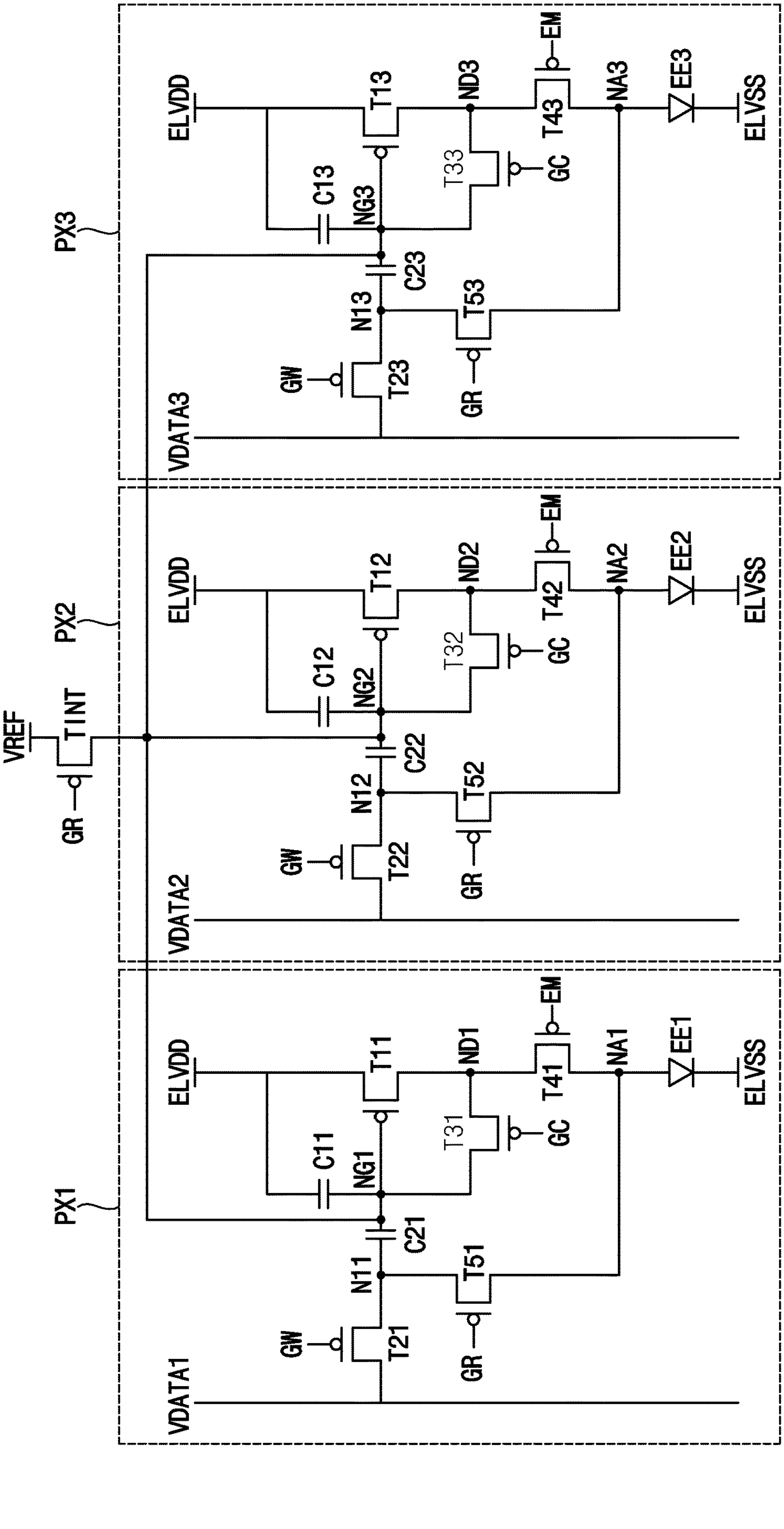
FIG. 16 is a circuit diagram illustrating pixels of a display panel of a display apparatus according to an embodiment of the present inventive concept.
Figure 17:
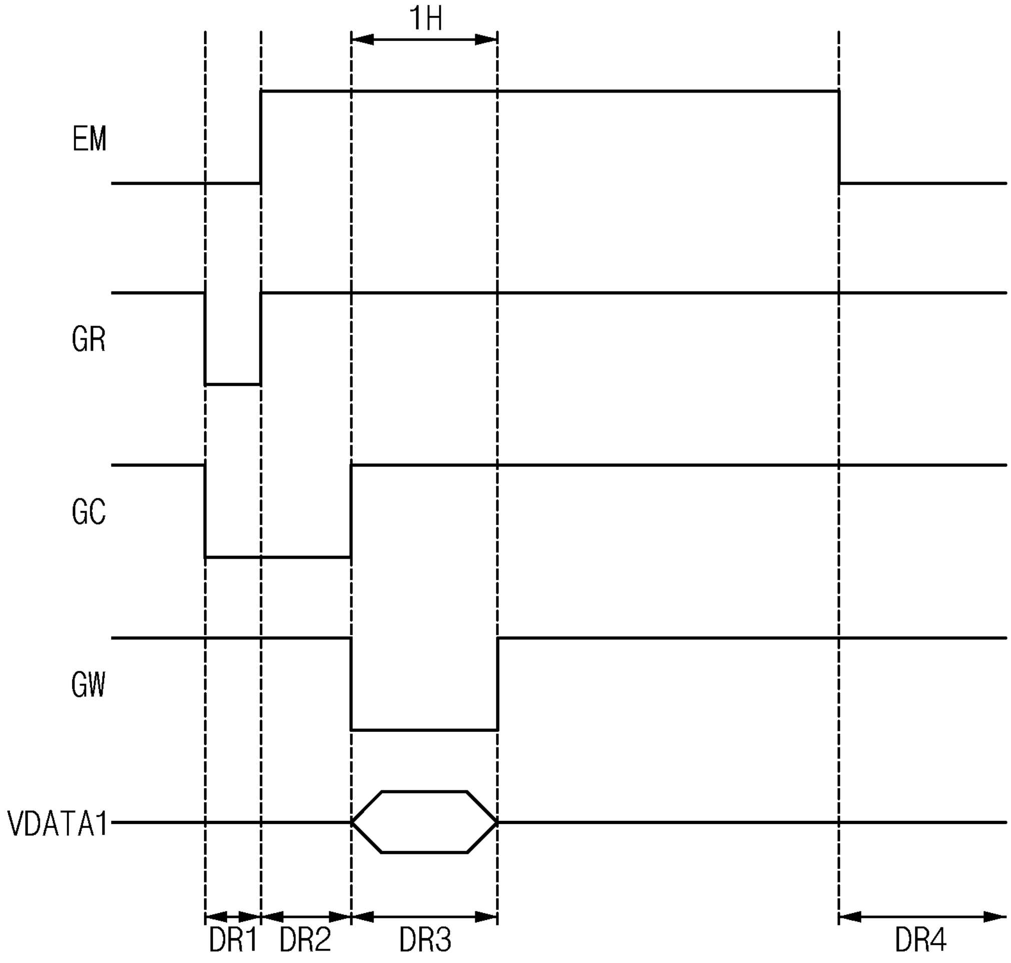
FIG. 17 is a timing diagram illustrating an example of input signals applied to a first pixel of FIG. 16.

FIG. 16 is a circuit diagram illustrating pixels of a display panel 100 of a display apparatus according to an embodiment of the present inventive concept. FIG. 17 is a timing diagram illustrating an example of input signals applied to a first pixel of FIG. 16.

The display panel according to the present embodiment is substantially the same as the display panel of the previous embodiment explained referring to FIG. 2 except for a position where the initialization transistor is connected to the first pixel, the second pixel and the third pixel and the driving timing according to the present embodiment is substantially the same as the driving timing of the previous embodiment explained referring to FIGS. 4, 6, 8 and 10 except for the timing of the initialization gate signal. Thus, the same reference numerals will be used to refer to the same or like parts as those described in the previous embodiment of FIGS. 1 to 10 and any repetitive explanation concerning the above elements will be omitted.

Referring to FIGS. 1, 16 and 17, the display panel 100 includes a first pixel PX1, a second pixel PX2 and an initialization transistor TINT. The first pixel PX1 may emit a first light emitting element EE1 based on a data writing gate signal GW, an initialization gate signal GR, a compensation gate signal GC, the emission signal EM and a first data voltage VDATA1. The second pixel PX2 may emit a second light emitting element EE2 based on the data writing gate signal GW, the initialization gate signal GR, the compensation gate signal GC, the emission signal EM and a second data voltage VDATA2.

The initialization transistor TINT is commonly connected to the first pixel PX1 and the second pixel PX2. The initialization transistor TINT outputs an initialization voltage VREF to the first pixel PX1 and the second pixel PX2 in response to the initialization gate signal GR.

The first pixel PX1 may include a first transistor T11 including a control electrode connected to a gate node NG1, a first electrode receiving a first power voltage ELVDD and a second electrode connected to a second node ND1, a second transistor T21 including a control electrode receiving the data writing gate signal GW, a first electrode receiving the first data voltage VDATA1 and a second electrode connected to a first node N11, a third transistor T31 including a control electrode receiving the compensation gate signal GC, a first electrode connected to the gate node NG1 and a second electrode connected to the second node ND1, a fourth transistor T41 including a control electrode receiving the emission signal EM, a first electrode connected to the second node ND1 and a second electrode connected to an anode node NA1, a fifth transistor T51 including a control electrode receiving the initialization gate signal GR, a first electrode connected to the first node N11 and a second electrode connected to the anode node NA1 and a first light emitting element EE1 including a first electrode connected to the anode node NA1 and a second electrode receiving a second power voltage ELVSS.

In the present embodiment, the initialization transistor TINT may be connected to the gate node NG1 of the first pixel PX1. In addition, the initialization transistor TINT may be connected to the gate node NG2 of the second pixel PX2. In addition, the initialization transistor TINT may be connected to the gate node NG3 of the third pixel PX3.

In FIG. 17, the first period DR1 may be the initialization period, the second period DR2 may be the threshold voltage compensation period, the third period DR3 may be the data writing period and the fourth period DR4 may be the light emitting period.

In the first period DR1, the emission signal EM may have the active level, the initialization gate signal GR may have the active level, the compensation gate signal GC may have the active level and the data writing gate signal GW may have the inactive level.

In the first period DR1, the initialization gate signal GR has the active level so that the initialization transistor TINT is turned on by the initialization gate signal GR and the first node N11 may be initialized to the initialization voltage VREF.

In addition, in the first period DR1, the compensation gate signal GC and the emission signal EM have the active levels so that the third transistor T31 is turned on by the compensation gate signal GC and the fourth transistor T41 is turned on by the emission signal EM, and thus, the gate node NG1 may be initialized to the initialization voltage VREF.

In addition, in the first period DR1, the fifth transistor T51 is turned on by the initialization gate signal GR, and thus, the first node N11 may be initialized to the initialization voltage VREF.

In the second period DR2 subsequent to the first period DR1, the emission signal EM may have the inactive level, the initialization gate signal GR may have the inactive level, the compensation gate signal GC may have the active level and the data writing gate signal GW may have the inactive level.

In the third period DR3 subsequent to the second period DR2, the emission signal EM may have the inactive level, the initialization gate signal GR may have the inactive level, the compensation gate signal GC may have the inactive level and the data writing gate signal GW may have the active level.

In the fourth period DR4 subsequent to the third period DR3, the emission signal EM may have the active level, the initialization gate signal GR may have the inactive level, the compensation gate signal GC may have the inactive level and the data writing gate signal GW may have the inactive level.

According to the present embodiment, the plurality of pixels may share one initialization transistor TINT in the display panel 100. Thus, the pixel circuit may include fewer than six transistors (e.g., 5.33) and two capacitors. The pixel circuit may operate internal compensation and have a relatively fewer transistors compared to the conventional pixel circuit, so that the high integration may be achieved. Thus, the pixel circuit may be applicable to an ultra-high resolution display apparatus.

In addition, in a driving timing of the pixel circuit, the data writing period DR3 may be separated from the initialization period DR1 and the threshold voltage compensation period DR2 so that one horizontal period may be longer compared to one horizontal period in a driving timing of the conventional pixel circuit. Therefore, it is easy to apply the demux circuit of the data driver 500 for driving several data lines within one horizontal period.

In addition, a data range may be wider by reducing a slope of the current curve according to the voltage of the driving transistor T11, T12 and T13 of the pixel circuit.

Figure 18:
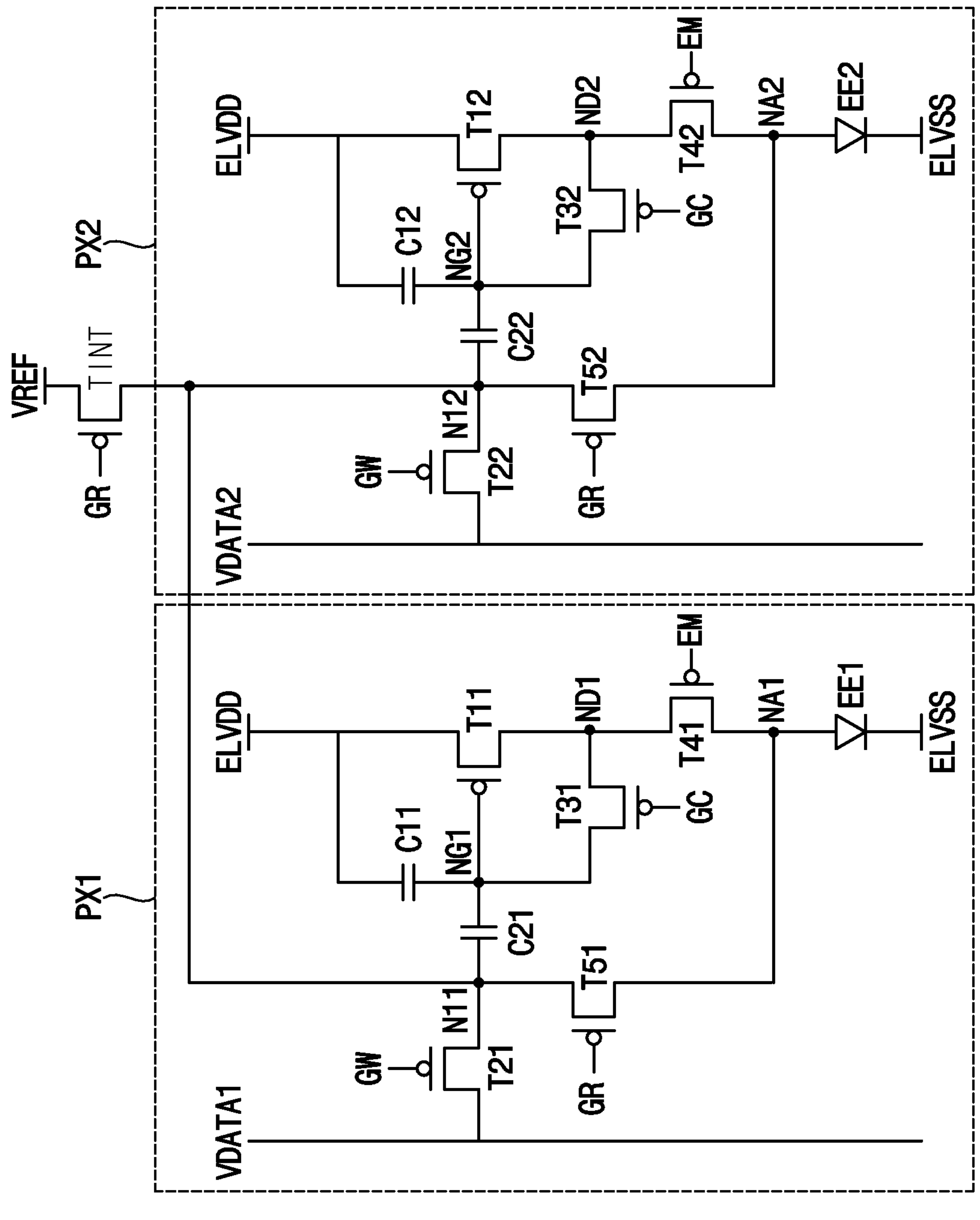
FIG. 18 is a circuit diagram illustrating pixels of a display panel of a display apparatus according to an embodiment of the present inventive concept.

FIG. 18 is a circuit diagram illustrating pixels of a display panel 100 of a display apparatus according to an embodiment of the present inventive concept.

The display panel according to the present embodiment is substantially the same as the display panel of the previous embodiment explained referring to FIG. 2 except that the initialization transistor is commonly connected to two pixels and the driving timing according to the present embodiment is substantially the same as the driving timing of the previous embodiment explained referring to FIGS. 4, 6, 8 and 10. Thus, the same reference numerals will be used to refer to the same or like parts as those described in the previous embodiment of FIGS. 1 to 10 and any repetitive explanation concerning the above elements will be omitted.

Referring to FIGS. 1, 18, the display panel 100 includes a first pixel PX1, a second pixel PX2 and an initialization transistor TINT. The first pixel PX1 may emit a first light emitting element EE1 based on a data writing gate signal GW, an initialization gate signal GR, a compensation gate signal GC, the emission signal EM and a first data voltage VDATA1. The second pixel PX2 may emit a second light emitting element EE2 based on the data writing gate signal GW, the initialization gate signal GR, the compensation gate signal GC, the emission signal EM and a second data voltage VDATA2.

The initialization transistor TINT is commonly connected to the first pixel PX1 and the second pixel PX2. The initialization transistor TINT outputs an initialization voltage VREF to the first pixel PX1 and the second pixel PX2 in response to the initialization gate signal GR.

In the present embodiment, the initialization transistor TINT may be commonly connected to two pixels PX1 and PX2.

In the present embodiment, two pixels PX1 and PX2 each including five transistors share one initialization transistor TINT, so that it may be referred that one pixel includes 5.5 transistors.

According to the present embodiment, the plurality of pixels may share one initialization transistor TINT in the display panel 100. Thus, the pixel circuit may include fewer than six transistors (e.g., 5.5) and two capacitors. The pixel circuit may operate internal compensation and have a relatively fewer transistors compared to the conventional pixel circuit, so that the high integration may be achieved. Thus, the pixel circuit may be applicable to an ultra-high resolution display apparatus.

In addition, in a driving timing of the pixel circuit, the data writing period DR3 may be separated from the initialization period DR1 and the threshold voltage compensation period DR2 so that one horizontal period may be longer compared to one horizontal period in a driving timing of the conventional pixel circuit. Therefore, it is easy to apply the demux circuit of the data driver 500 for driving several data lines within one horizontal period.

In addition, a data range may be wider by reducing a slope of the current curve according to the voltage of the driving transistor T11 and T12 of the pixel circuit.

Figure 19:
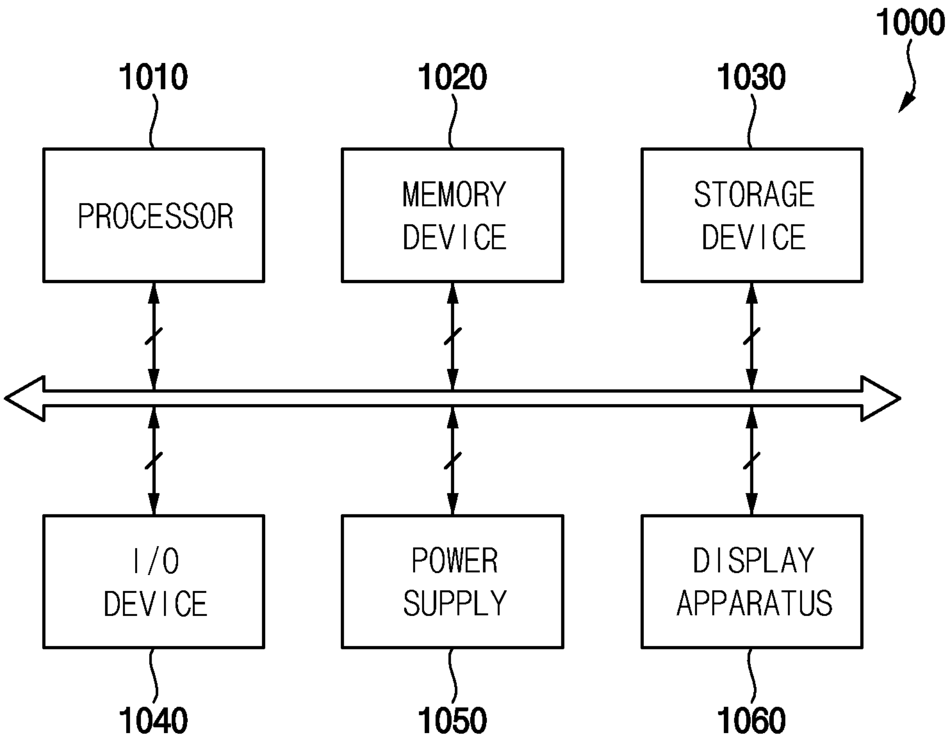
FIG. 19 is a block diagram illustrating an electronic apparatus according to an embodiment of the present inventive concept.
Figure 20:
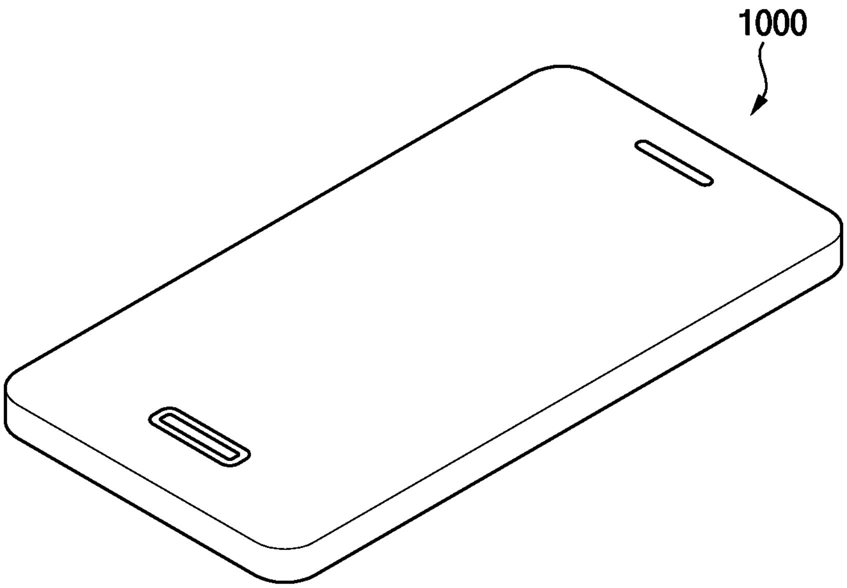
FIG. 20 is a diagram illustrating an example in which the electronic apparatus of FIG. 19 is implemented as a smart phone.

FIG. 19 is a block diagram illustrating an electronic apparatus according to an embodiment of the present inventive concept. FIG. 20 is a diagram illustrating an example in which the electronic apparatus of FIG. 19 is implemented as a smart phone.

Referring to FIGS. 19 and 20, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 20, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 21:
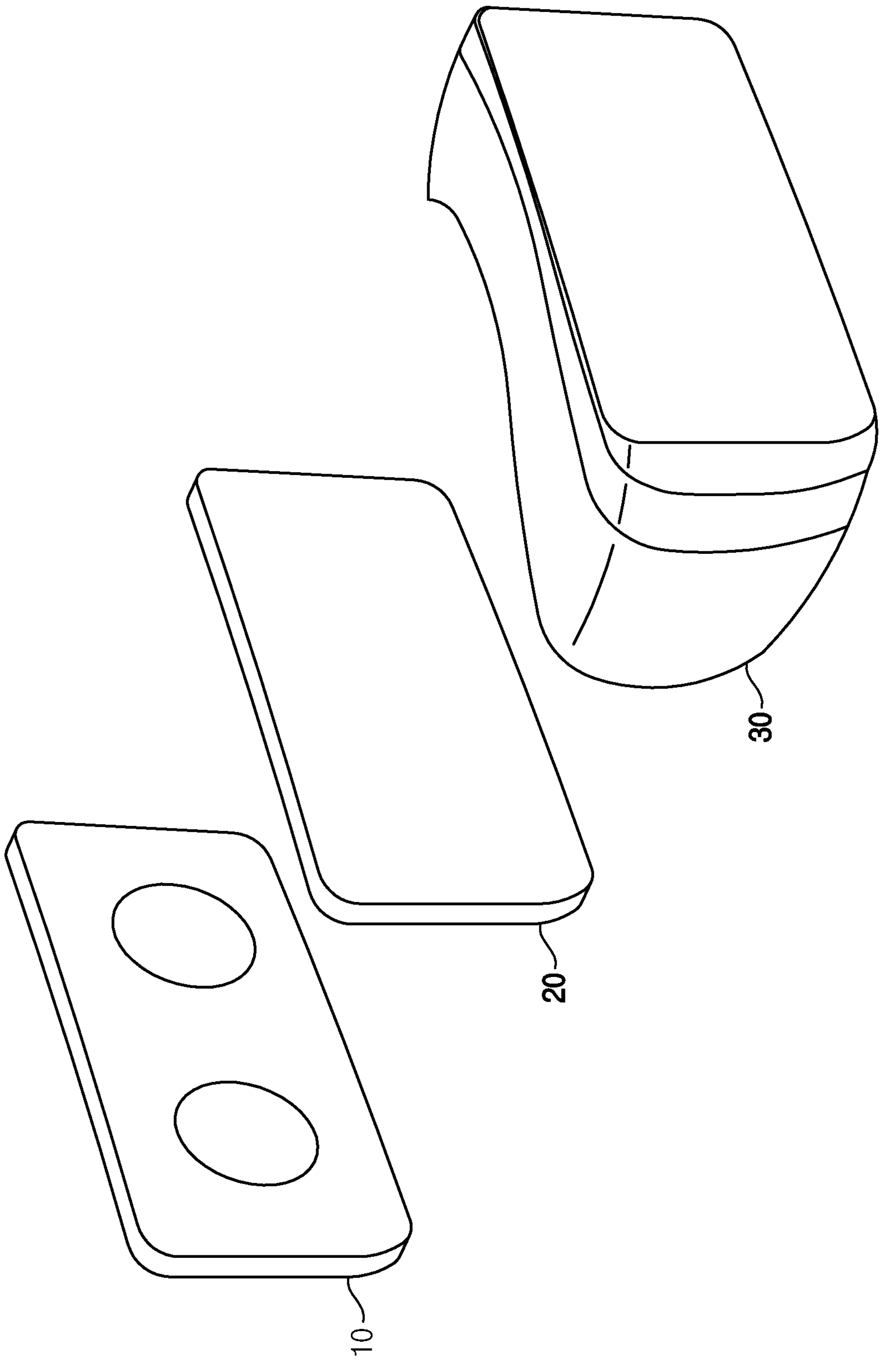
FIG. 21 is a diagram illustrating an example in which the electronic apparatus of FIG. 19 is implemented as a virtual reality display system.

FIG. 21 is a diagram illustrating an example in which the electronic apparatus of FIG. 19 is implemented as a virtual reality display system.

Referring to FIGS. 19 and 21, the virtual reality display system includes a lens unit 10, a display apparatus 20 and a housing 30. The display apparatus 20 is disposed adjacent to the lens unit 10. The housing 30 may receive the lens unit 10 and the display apparatus 20. Although the lens unit 10 and the display apparatus 20 are received in a first side of the housing 30 in FIG. 21, the present inventive concept may not be limited thereto. Alternatively, the lens unit 10 may be received in a first side of the housing 30 and the display apparatus 20 may be received in a second side of the housing 30 opposite to the first side of the housing 30. When the lens unit 10 and the display apparatus 20 are received in the housing 30 in opposite sides, the housing 30 may have a transmission area to transmit a light.

For example, the virtual reality display system may be a head mounted display system which is wearable on a head of a user. Although not shown in figures, the virtual reality display system may further include a head band to fix the virtual reality display system on the head of the user.

Alternatively, the virtual reality display system may be smart glasses having a shape of glasses.

In addition, the electronic apparatus may be an augmented reality display system, a mixed reality display system, or an extended reality display system.

According to the display panel and the display apparatus of the present inventive concept as explained above, the ultra-high resolution display apparatus may be implemented using the pixel circuit having the high integration.

The foregoing is illustrative of the present inventive concept and is not to be construed as limiting thereof. Although embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display panel comprising:

a first pixel including a first light emitting element configured to emit light based on a data writing gate signal, an initialization gate signal, a compensation gate signal, an emission signal and a first data voltage;

a second pixel including a second light emitting element configured to emit light based on the data writing gate signal, the initialization gate signal, the compensation gate signal, the emission signal and a second data voltage; and an initialization transistor commonly connected to the first pixel and the second pixel, and configured to output an initialization voltage to a first node of the first pixel and a first node of the second pixel in response to the initialization gate signal, wherein the first pixel further comprises a fifth transistor of the first pixel including a control electrode configured to receive the initialization gate signal, a first electrode connected to the first node of the first pixel and a second electrode connected to an anode node of the first light emitting element, wherein the second pixel further comprises a fifth transistor of the second pixel including a control electrode configured to receive the initialization gate signal, a first electrode connected to the first node of the second pixel and a second electrode connected to an anode node of the second light emitting element, wherein the initialization transistor is commonly connected to the fifth transistor of the first pixel and the fifth transistor of the second pixel, wherein the first pixel further comprises:

a first transistor including a control electrode connected to a gate node, a first electrode configured to receive a first power voltage and a second electrode connected to a second node;

a second transistor including a control electrode configured to receive the data writing gate signal, a first electrode configured to receive the first data voltage and a second electrode connected to the first node of the first pixel;

a third transistor including a control electrode configured to receive the compensation gate signal, a first electrode connected to the gate node and a second electrode connected to the second node; and a fourth transistor including a control electrode configured to receive the emission signal, a first electrode connected to the second node and a second electrode connected to the anode node of the first light emitting element, wherein the first light emitting element includes a first electrode connected to the anode node of the first light emitting element and a second electrode configured to receive a second power voltage.

2. The display panel of claim 1, further comprising a third pixel including a third light emitting element configured to emit light based on the data writing gate signal, the initialization gate signal, the compensation gate signal, the emission signal and a third data voltage, wherein the initialization transistor is commonly connected to the first pixel, the second pixel and the third pixel, and configured to output the initialization voltage to the first pixel, the second pixel and the third pixel in response to the initialization gate signal.

3. The display panel of claim 2, wherein the first pixel is a red pixel, wherein the second pixel is a green pixel, and wherein the third pixel is a blue pixel.

4. The display panel of claim 1, wherein the first pixel further comprises:

a first capacitor including a first end configured to receive the first power voltage and a second end connected to the gate node; and a second capacitor including a first end connected to the first node of the first pixel and a second end connected to the gate node.

5. The display panel of claim 1, wherein the initialization transistor is connected to the first node of the first pixel.

6. The display panel of claim 5, wherein the emission signal has an active level, the initialization gate signal has an active level, the compensation gate signal has an active level and the data writing gate signal has an inactive level in a first period.

7. The display panel of claim 6, wherein the emission signal has an inactive level, the initialization gate signal has the active level, the compensation gate signal has the active level and the data writing gate signal has the inactive level in a second period subsequent to the first period.

8. The display panel of claim 7, wherein the emission signal has the inactive level, the initialization gate signal has an inactive level, the compensation gate signal has an inactive level and the data writing gate signal has an active level in a third period subsequent to the second period.

9. The display panel of claim 8, wherein the emission signal has the active level, the initialization gate signal has the inactive level, the compensation gate signal has the inactive level and the data writing gate signal has the inactive level in a fourth period subsequent to the third period.

10. A display apparatus comprising:

a display panel including a pixel;

a gate driver configured to output a gate signal to the pixel;

a data driver configured to output a data voltage to the pixel; and an emission driver configured to output an emission signal to the pixel, wherein the display panel comprises:

a first pixel including a first light emitting element configured to emit light based on a data writing gate signal, an initialization gate signal, a compensation gate signal, the emission signal and a first data voltage;

a second pixel including a second light emitting element configured to emit light based on the data writing gate signal, the initialization gate signal, the compensation gate signal, the emission signal and a second data voltage; and an initialization transistor commonly connected to the first pixel and the second pixel, and configured to output an initialization voltage to a first node of the first pixel and a first node of the second pixel in response to the initialization gate signal, wherein the first pixel further comprises a fifth transistor of the first pixel including a control electrode configured to receive the initialization gate signal, a first electrode connected to the first node of the first pixel and a second electrode connected to an anode node of the first light emitting element, wherein the second pixel further comprises a fifth transistor of the second pixel including a control electrode configured to receive the initialization gate signal, a first electrode connected to the first node of the second pixel and a second electrode connected to an anode node of the second light emitting element, wherein the initialization transistor is commonly connected to the fifth transistor of the first pixel and the fifth transistor of the second pixel, wherein the first pixel further comprises:

a first transistor including a control electrode connected to a gate node, a first electrode configured to receive a first power voltage and a second electrode connected to a second node;

a second transistor including a control electrode configured to receive the data writing gate signal, a first electrode configured to receive the first data voltage and a second electrode connected to the first node of the first pixel;

a third transistor including a control electrode configured to receive the compensation gate signal, a first electrode connected to the gate node and a second electrode connected to the second node; and a fourth transistor including a control electrode configured to receive the emission signal, a first electrode connected to the second node and a second electrode connected to the anode node of the first light emitting element, wherein the first light emitting element includes a first electrode connected to the anode node of the first light emitting element and a second electrode configured to receive a second power voltage.

11. An electronic apparatus comprising:

a display panel including a pixel;

a gate driver configured to output a gate signal to the pixel;

a data driver configured to output a data voltage to the pixel;

an emission driver configured to output an emission signal to the pixel;

a driving controller configured to control the gate driver, the data driver and the emission driver; and a processor configured to output input image data and an input control signal to the driving controller, wherein the display panel comprises:

a first pixel including a first light emitting element configured to emit light based on a data writing gate signal, an initialization gate signal, a compensation gate signal, the emission signal and a first data voltage;

a second pixel including a second light emitting element configured to emit light based on the data writing gate signal, the initialization gate signal, the compensation gate signal, the emission signal and a second data voltage; and an initialization transistor commonly connected to the first pixel and the second pixel, and configured to output an initialization voltage to a first node of the first pixel and a first node of the second pixel in response to the initialization gate signal, wherein the first pixel further comprises a fifth transistor of the first pixel including a control electrode configured to receive the initialization gate signal, a first electrode connected to the first node of the first pixel and a second electrode connected to an anode node of the first light emitting element, wherein the second pixel further comprises a fifth transistor of the second pixel including a control electrode configured to receive the initialization gate signal, a first electrode connected to the first node of the second pixel and a second electrode connected to an anode node of the second light emitting element, wherein the initialization transistor is commonly connected to the fifth transistor of the first pixel and the fifth transistor of the second pixel, wherein the first pixel further comprises:

a first transistor including a control electrode connected to a gate node, a first electrode configured to receive a first power voltage and a second electrode connected to a second node;

a second transistor including a control electrode configured to receive the data writing gate signal, a first electrode configured to receive the first data voltage and a second electrode connected to the first node of the first pixel;

a third transistor including a control electrode configured to receive the compensation gate signal, a first electrode connected to the gate node and a second electrode connected to the second node; and a fourth transistor including a control electrode configured to receive the emission signal, a first electrode connected to the second node and a second electrode connected to the anode node of the first light emitting element, wherein the first light emitting element includes a first electrode connected to the anode node of the first light emitting element and a second electrode configured to receive a second power voltage.

* * * * *